United States Patent [19]
Tong

[11] Patent Number: 5,847,383
[45] Date of Patent: Dec. 8, 1998

[54] APPROACHING DEVICE OF SCANNING PROBE MICROSCOPE

[75] Inventor: Yi Tong, Hachioji, Japan

[73] Assignee: Olympus Optical Co., Ltd., Tokyo, Japan

[21] Appl. No.: 723,093

[22] Filed: Sep. 30, 1996

[30] Foreign Application Priority Data

Oct. 5, 1995 [JP] Japan ................................. 7-258831

[51] Int. Cl.[6] .................................................. H01J 37/00
[52] U.S. Cl. ............................ 250/234; 250/306; 73/105
[58] Field of Search .................................. 250/234, 235, 250/216, 306, 307; 73/105, 104

[56] References Cited

U.S. PATENT DOCUMENTS

| 5,103,095 | 4/1992 | Elings et al. | 250/306 |
| 5,336,887 | 8/1994 | Yagi et al. | 250/306 |
| 5,574,278 | 11/1996 | Poirier | 250/306 |
| 5,627,815 | 5/1997 | Koyanagi et al. | 250/306 |
| 5,656,769 | 8/1997 | Nakano et al. | 250/306 |

Primary Examiner—Edward P. Westin
Assistant Examiner—John R. Lee
Attorney, Agent, or Firm—Frishauf, Holtz, Goodman, Langer & Chick

[57] ABSTRACT

Light is reflected from a cantilever, and the reflected light, except that part which is reflected from the back of the cantilever, is applied to a light-receiving device. A distance between the probe of the cantilever and a sample is determined in accordance with changes in the light in order to protect both the sample and the probe and to shorten the time the probe requires to reach the sample. The probe is moved toward the sample at high speed until the probe reaches a point close to the sample. A mechanism is provided which detects changes in a probe-displacement signal representing the displacement of the probe. A differentiation section provided in the mechanism differentiates the probe-displacement signal and generates a signal. The signal is supplied to a threshold determination section, which determines whether or not the output signal of the differentiation section exceeds a predetermined threshold value. When the signal is found to exceed the threshold value, an approaching interruption section generates an interruption command, which is supplied to a motor driver, stopping, a motor. As a result, a coarse adjustment mechanism stops moving the prove toward the sample. A voltage at a predetermined level is then immediately applied to a piezoelectric member, causing the piezoelectric member to contract in the Z direction, thereby moving the probe away from the sample.

25 Claims, 20 Drawing Sheets

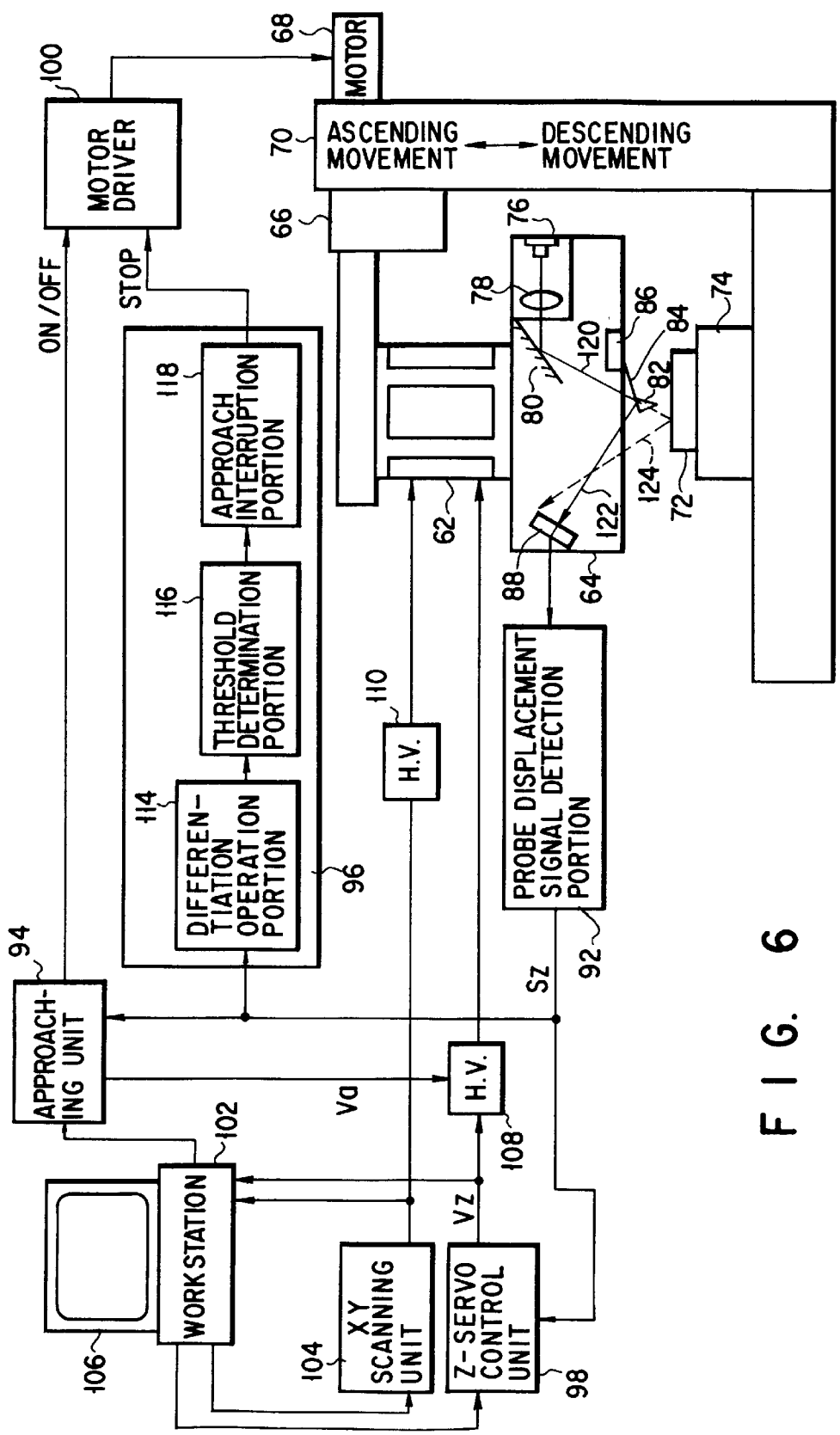
F I G. 6

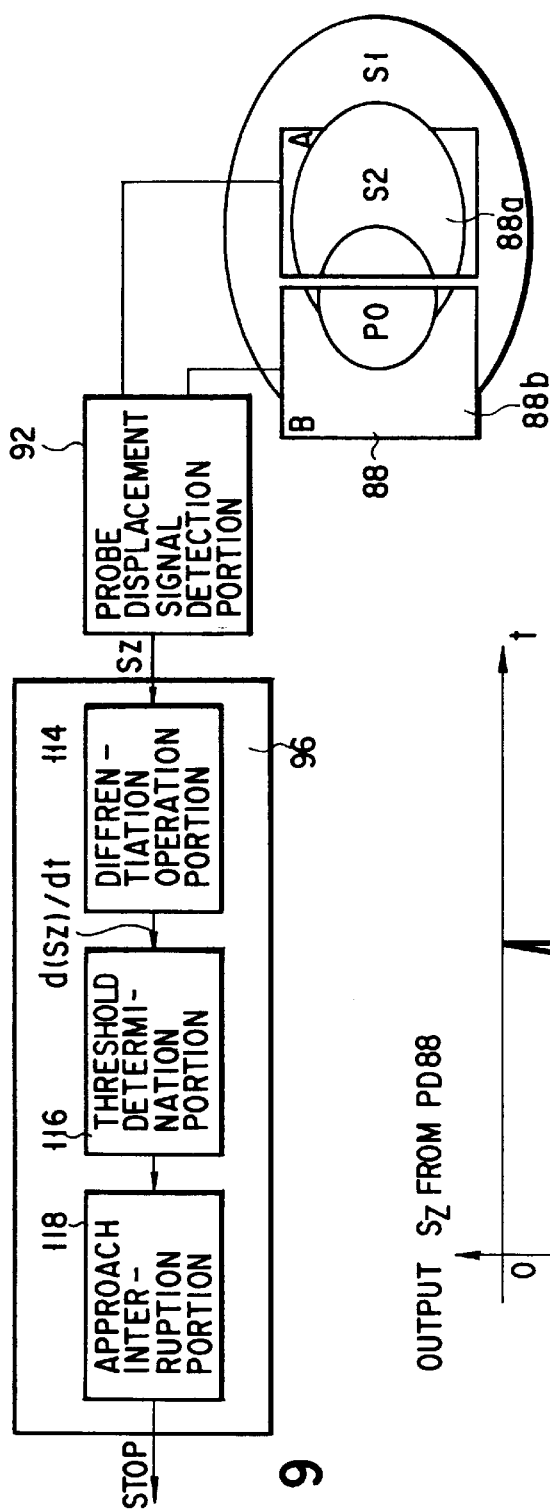
F I G. 9
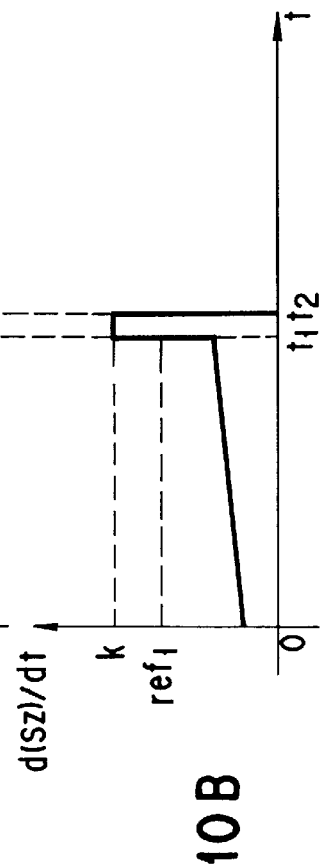
F I G. 10A
F I G. 10B

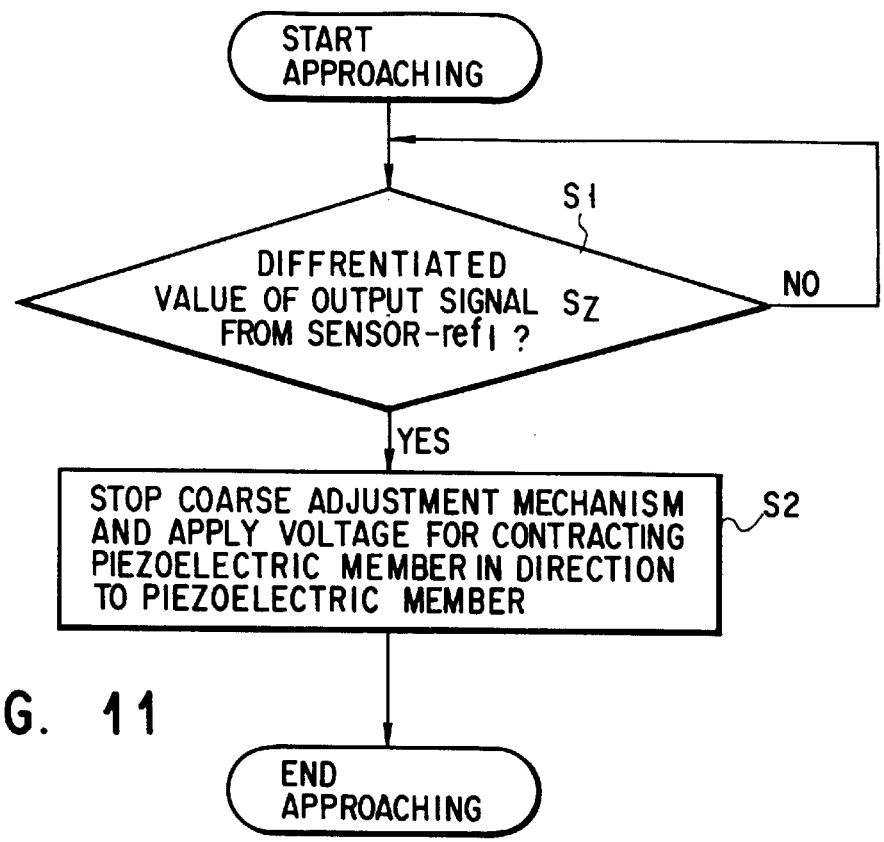
FIG. 11
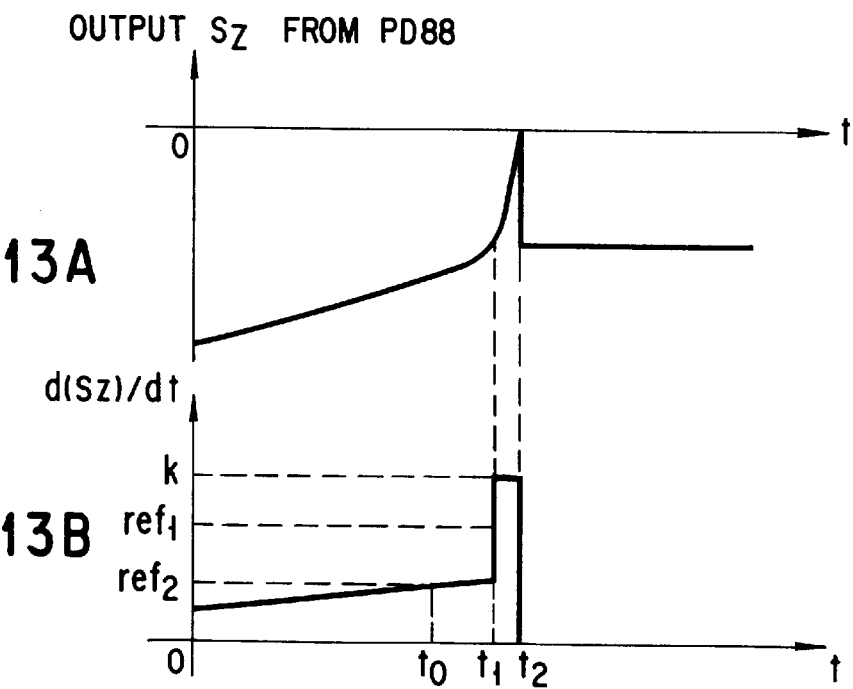
FIG. 13A
FIG. 13B

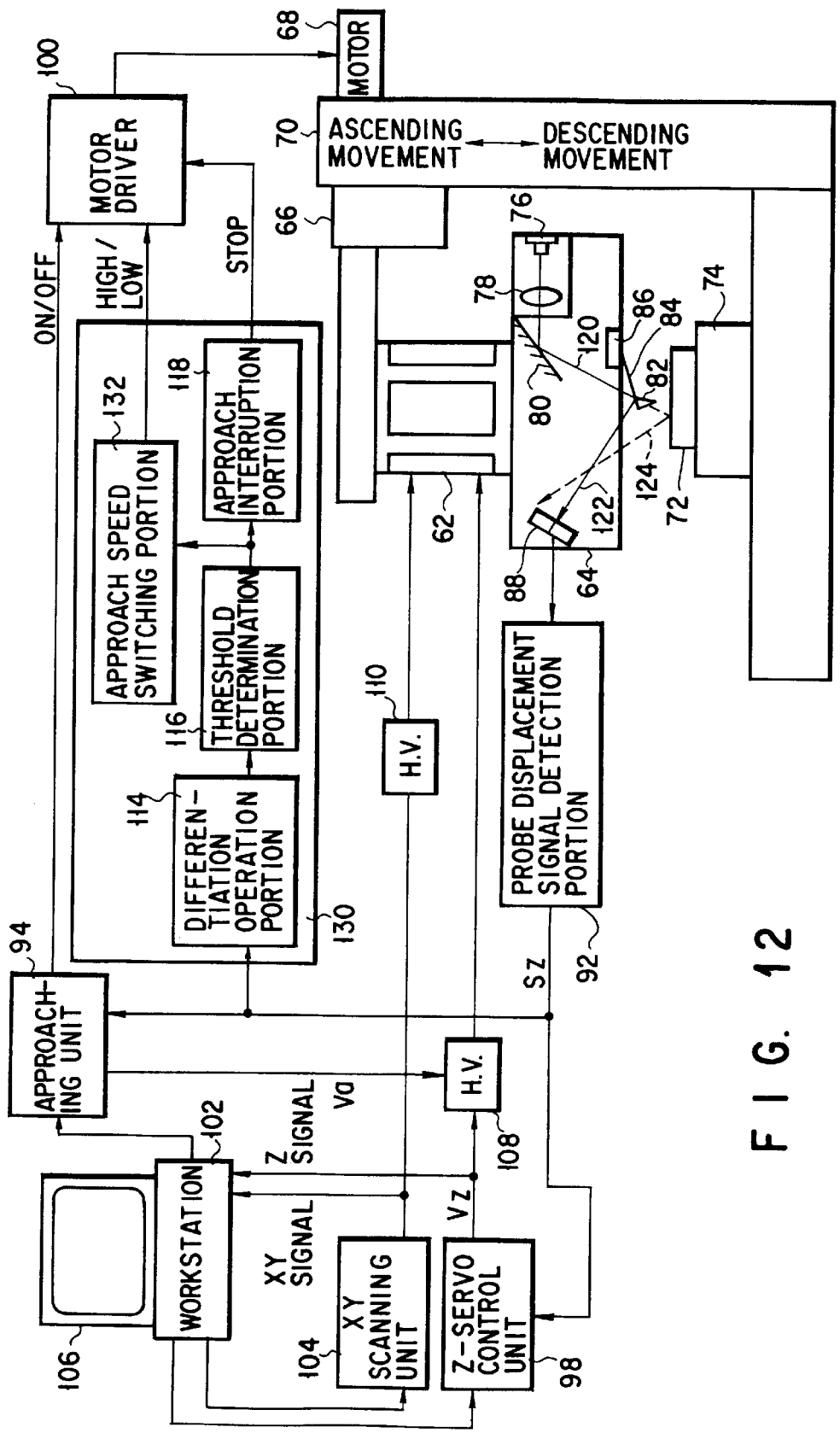
F I G. 12

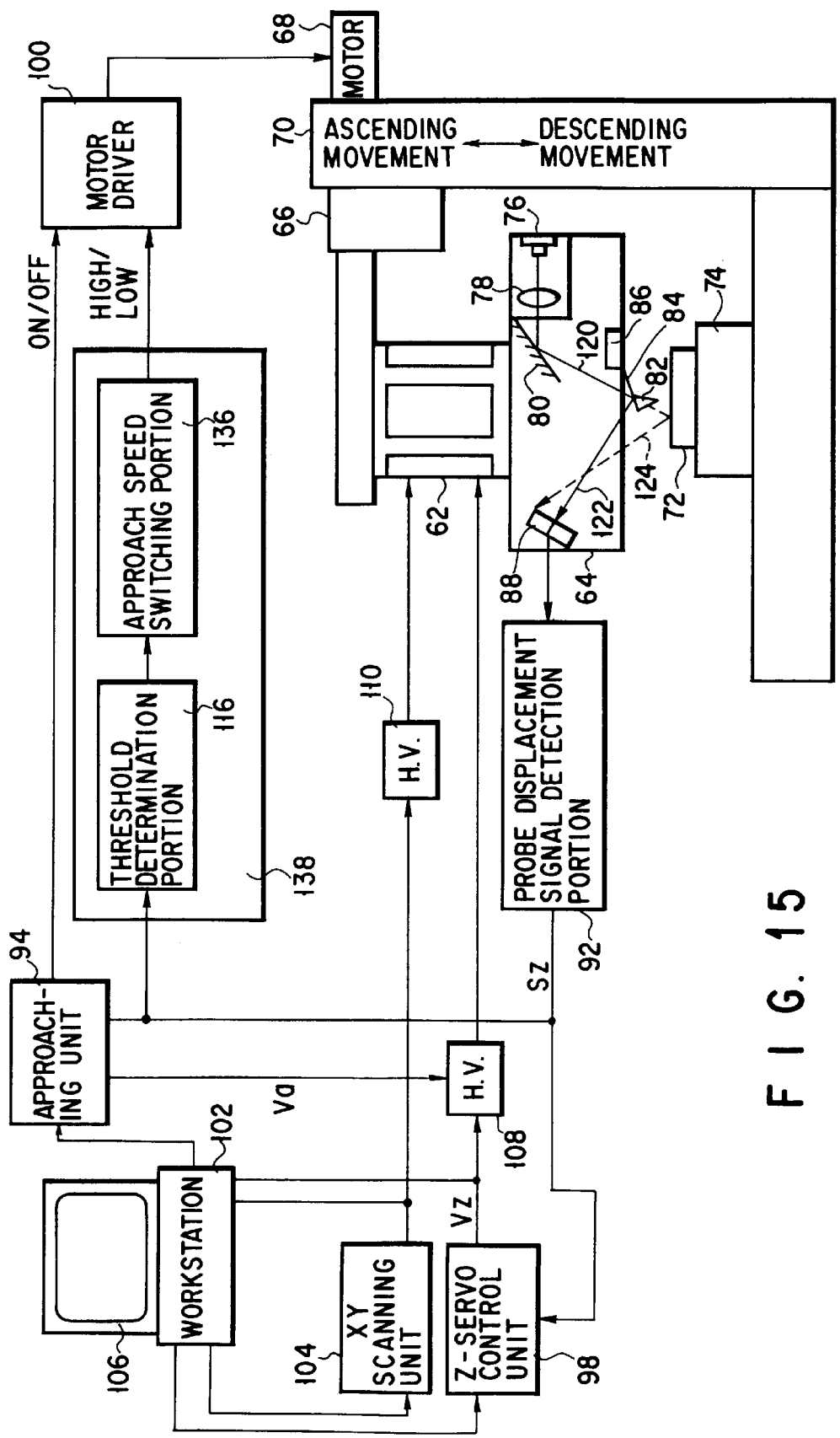
F I G. 15

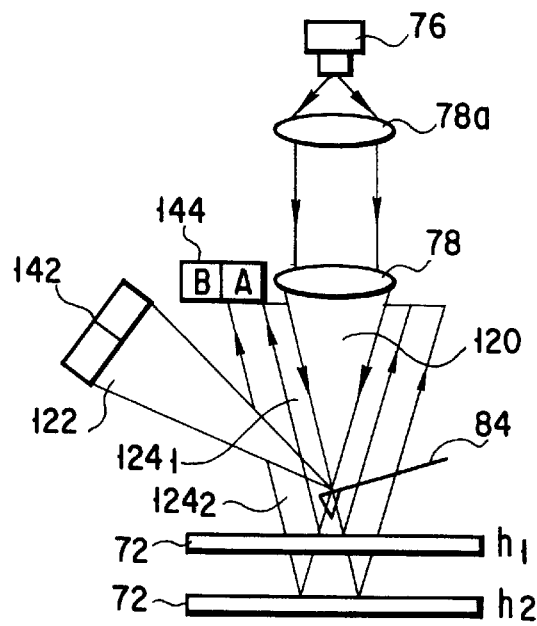
F I G. 20
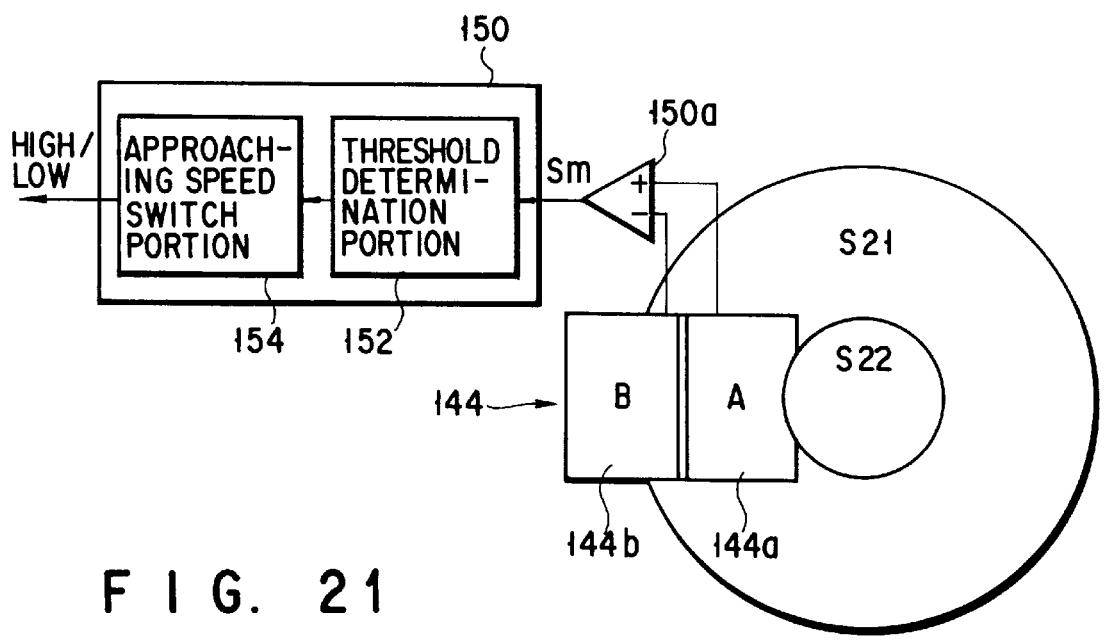
F I G. 21

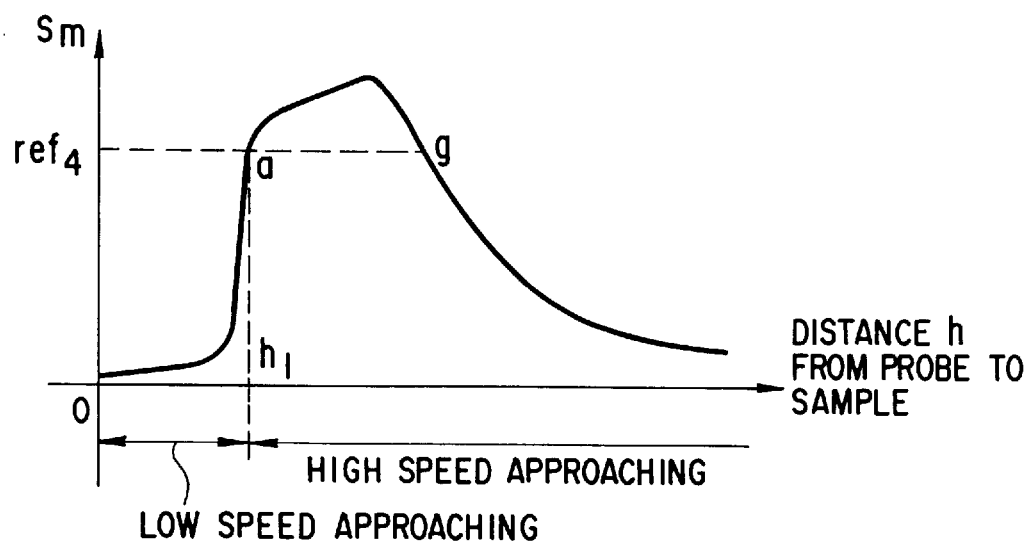
F I G. 22
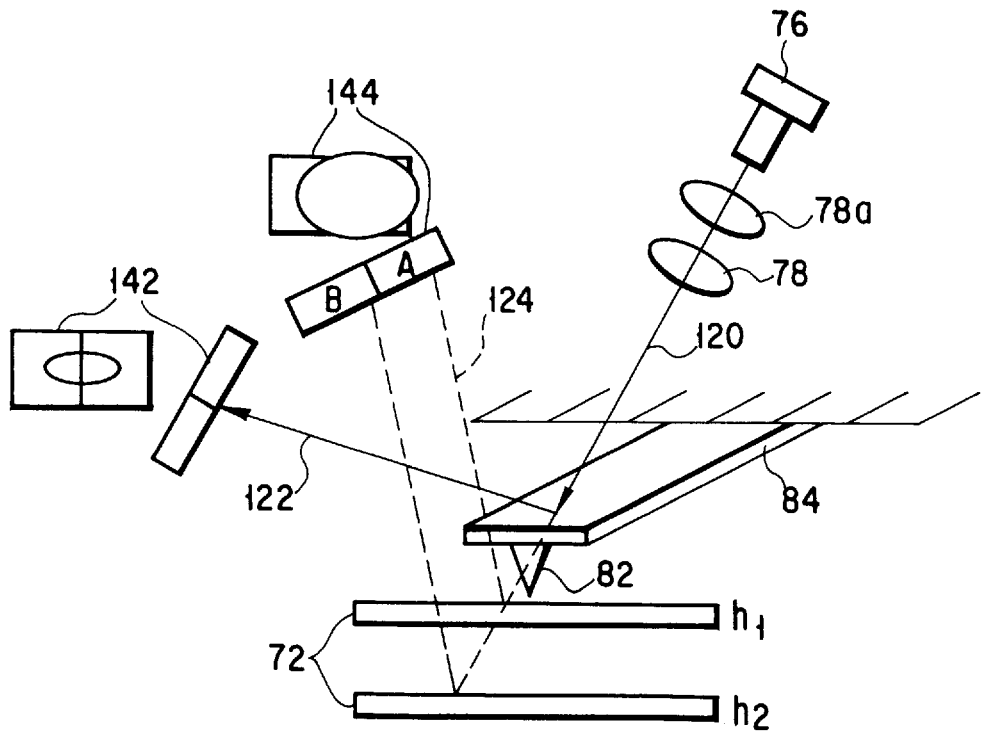
F I G. 24

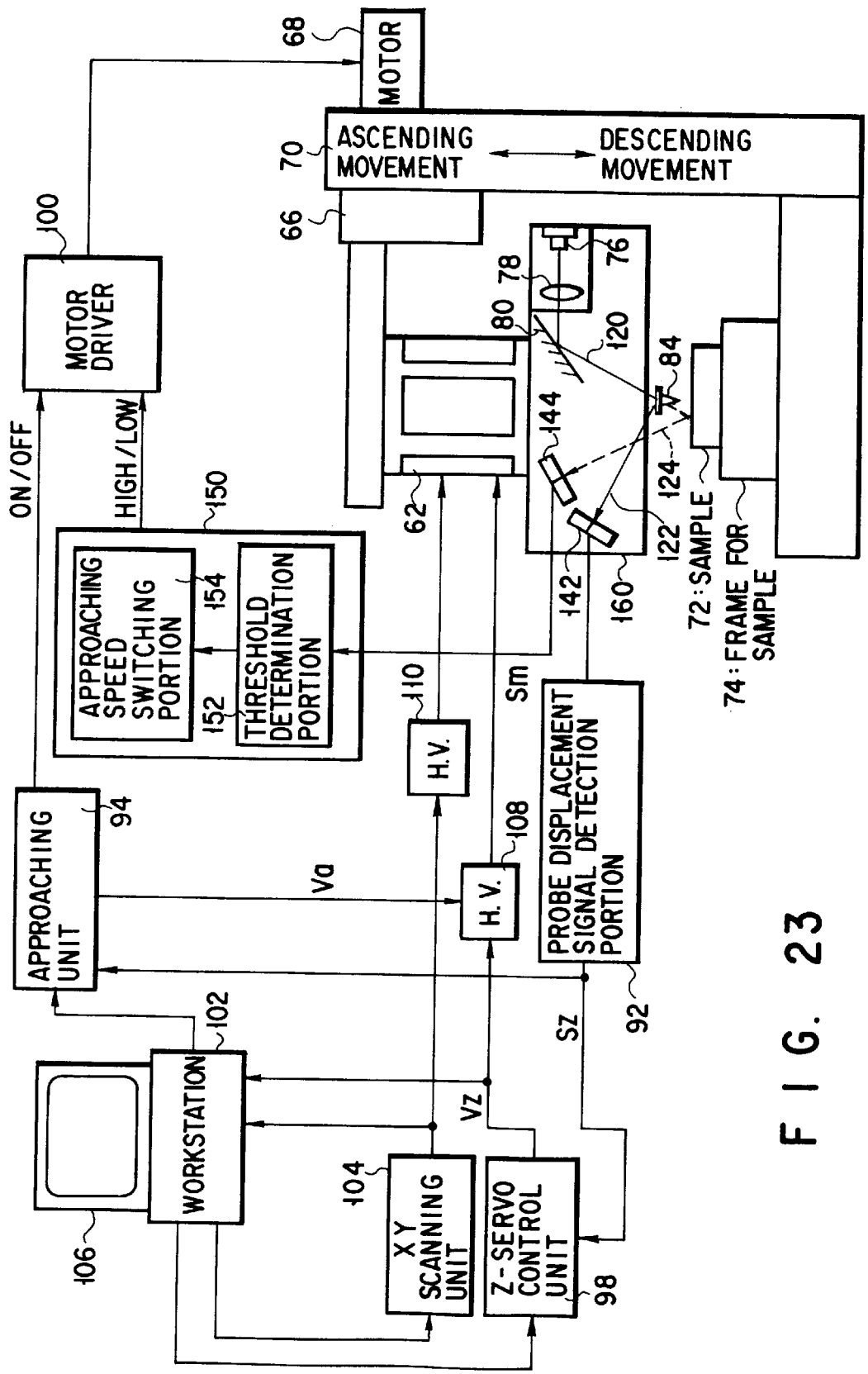
F I G. 23

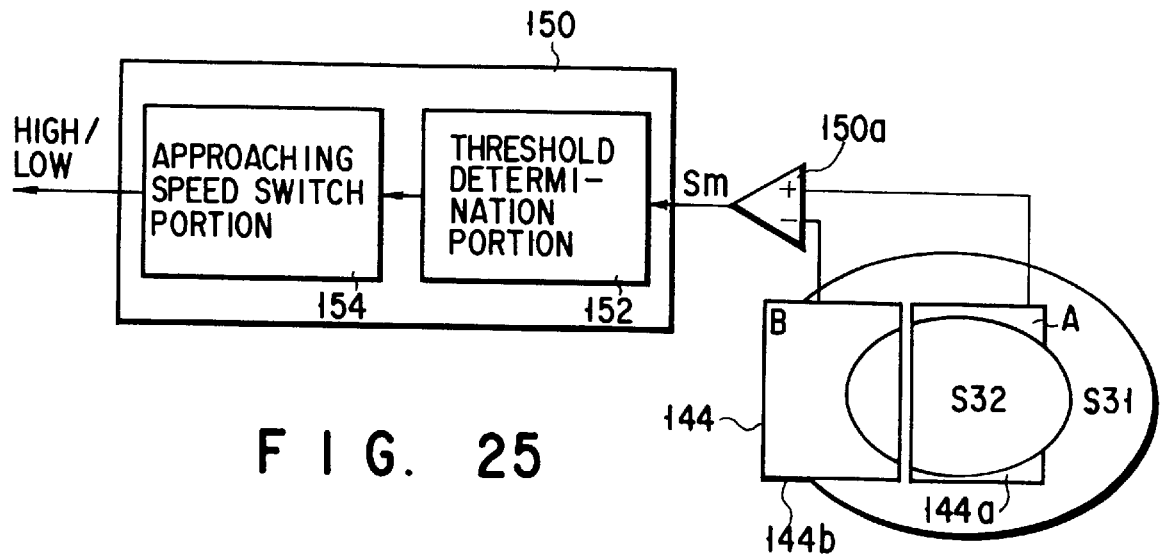
F I G. 25
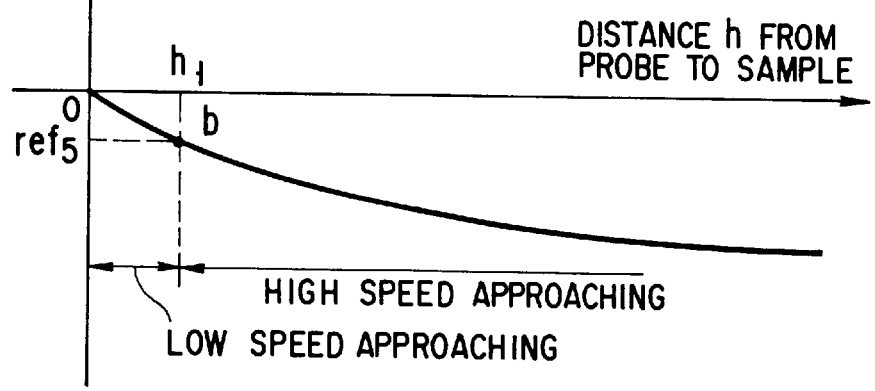
F I G. 26

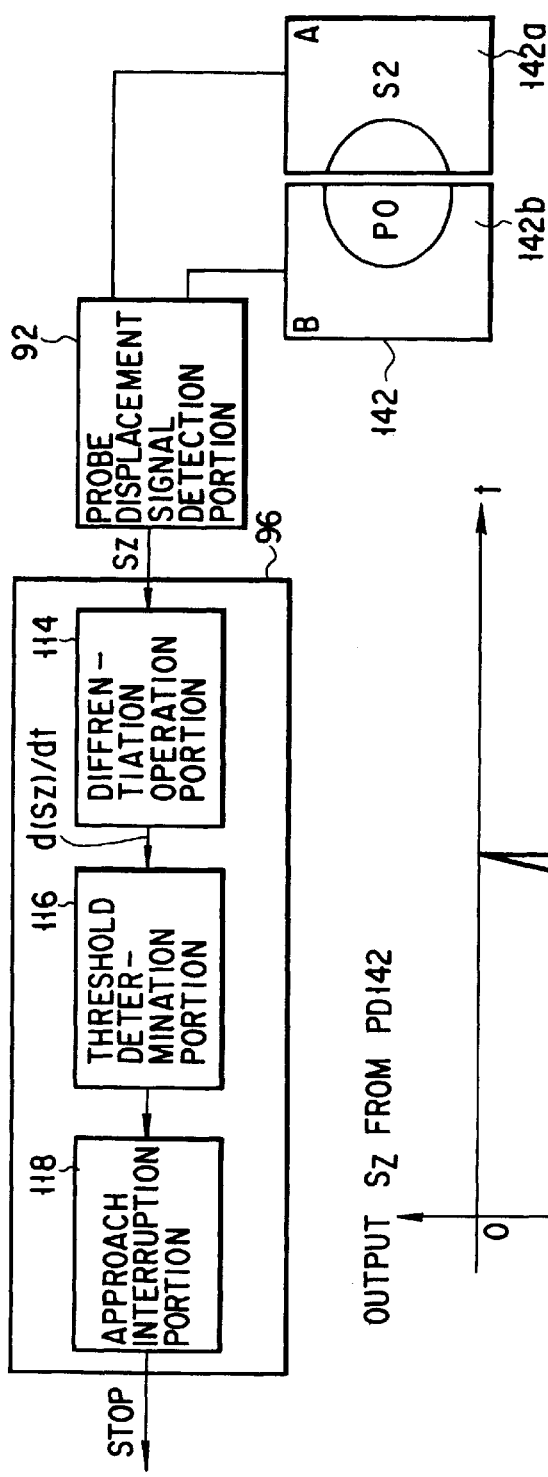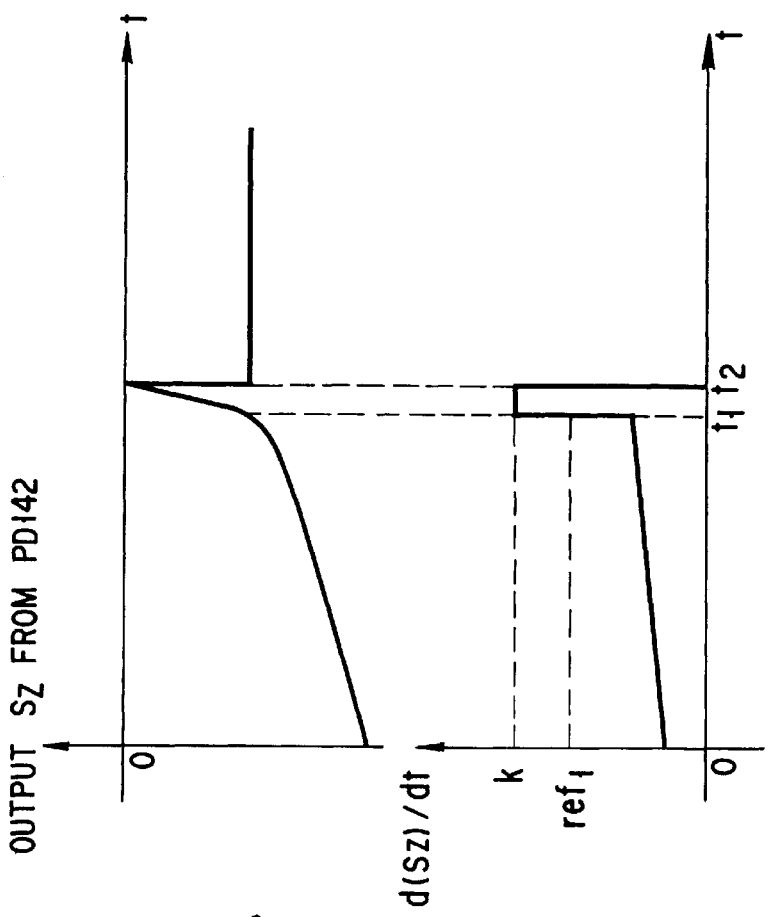
FIG. 28
FIG. 29A
FIG. 29B

APPROACHING DEVICE OF SCANNING PROBE MICROSCOPE

BACKGROUND OF THE INVENTION

1. Field of the Invention

The present invention relates to a scanning probe microscope, and more particularly to an approaching device of a scanning probe microscope which is capable of realizing a measurement, and an investigation apparatus for use in measuring and investigating semiconductors and materials which is capable of completing a desired measuring operation in a very short time with excellent resolution.

2. Description of the Related Art

In general, an Atomic Force Microscope (AFM) has been known as a microscope for detecting interatomic force or intermolecular force. The small force has been detected with said microscopes using, for example, an angle detection method, a light critical angle method, a light interference method, an electrostatic capacity method or the like. The angle detection method comprises the steps of detecting change in the angle of a light beam reflected by a cantilever by a bisectioned or quadrisectioned light receiving device, and detecting the displacement of the cantilever in accordance with the detected change in the angle. An optical lever method, which is one of the angle detection methods, requires only a simple structure and enables satisfactory sensitivity to be obtained. As a result, the optical lever method has been widely used in the AFM apparatuses.

FIG. 1 is a diagram showing an example of the structure of a conventional scanning probe microscope. The AFM shown in FIG. 1 measures the displacement of the cantilever by using an optical displacement sensor employing the conventional optical lever method.

Referring to FIG. 1, an optical displacement sensor 4 employing the optical lever method is secured to the free end of a piezoelectric member 2. A coarse adjustment mechanism 6 is attached to another end of the piezoelectric member 2 so that the coarse adjustment mechanism 6 is vertically moved along a stand 10 when a motor 8 is rotated. A sample frame 14 for holding a sample 12 to be measured is provided on the stand 10.

The optical displacement sensor 4 includes a laser diode (LD) 16, a converging lens 18 for converging laser beams, a reflecting mirror 20, a cantilever 24 disposed at the position of the focal point of the converging lens 18 and having a probe 22 at the free end thereof, a support frame 26 for holding the cantilever 24 and a bisectioned light receiving device (PD) 28 for receiving light beams reflected by the rear side of the cantilever 24. The cantilever 24 is attached to be inclined from the horizon of the support frame 26 by an angular degree of, for example, about 10°.

A cantilever probe displacement signal detection portion 32 measures the displacement of the probe 22 of the cantilever 24 by using the optical displacement sensor 4 employing the optical lever method. An output from the probe displacement signal detection section 32 is supplied to an approaching section 34 and a Z-servo control section 36. The approaching section 34 rotates the motor 8 through a motor driver 38.

The approaching section 34, the Z-servo control section 36 and an XY scanning section 42 are connected to a work station 40. Moreover, an image display unit 44, for storing transferred measurement data, forming a 3D image of the projection and pit information of the surface of the sample and analyzing information of the surface of the sample, is connected to the work station 40. The Z-servo control section 36 and the XY scanning section 42 control the direction of movement of the piezoelectric member 2 through corresponding high voltage (HV) amplifiers 46 and 48.

In the structure above, the Z-servo control section 36 feedback-controls the distance from the surface of the sample 12 to the tip of the probe 22 of the cantilever 24 to be maintained at a predetermined distance in a range of several nm. That is, Z control voltage Vz is applied to the piezoelectric member 2 through the high voltage amplifier 46, thereby expanding or contracting the member 2 so as to maintain a constant interatomic force acting between the sample 12 and leading end of the probe 22. While moving the probe 22 in the Z direction (the vertical direction), an XY scanning signal transmitted from the XY scanning section 42 is supplied to the piezoelectric member 2 to scan the 2D direction. Information obtained by superposing the Z control signal Vz on the XY scanning signal, i.e., the information representing the projections and pits of the sample, is transferred to the image display unit 44 through the work station 40.

Referring to FIGS. 1 to 3, the optical lever method to which the optical displacement sensor 4 is adapted will now be described.

FIG. 2 shows an example of a method in which laser beams are made incident right above the cantilever. Light beams made incident from the laser diode 16 are allowed to pass through a collimate lens 50 and the converging lens 18 so as to be formed into incident light beams 52 with which the rear side of the cantilever 24 is irradiated. Reflected light beams 54 from the cantilever 24 are received by the bisectioned light receiving device 28. On the other hand, reflected light beams 56 of leaked light are generated from the sample 12.

Reference numerals $56_1$ and $56_2$ represent reflected light beams of leaked light when the sample 12 is at positions $h_1$ and $h_2$.

FIG. 3 shows an example of a method in which light beams are made incident from a diagonally upper position of the cantilever. Similarly to the structure shown in FIG. 2, the incident light beam 52 emitted from the laser diode 16 is made incident upon the rear side of the cantilever 24. Then, the reflected light beam 54 from the cantilever 24 is received by the bisectioned light receiving device 28. Numeral 56 denotes the light beam leaking from the sample 12 and then reflected.

The AFM must detect the distance from the sample to the probe in a range of several nm to detect the interatomic force between the sample and the probe. However, since the range in which the piezoelectric member can be moved is narrow, an approaching operation must be performed before measurement is carried out such that the coarse adjustment mechanism causes the probe of the cantilever to approach the surface of the sample.

FIG. 4A is a graph showing an experimental waveform from the optical displacement sensor 4 when the approaching operation is performed. The coarse adjustment mechanism 6 is arranged to be interrupted when the output from the optical displacement sensor 4 has exceeded 0 V during the approaching operation. As shown in FIG. 4A, when the probe 22 has approached the sample 12, the output from the optical displacement sensor 4 is raised as is the output from the optical displacement sensor 4 caused by the displacement of the cantilever 24. Since this component corresponds to the beam of the leaked light 56 which becomes intense, the output Sz of the displacement sensor 4 increases as the probe 22 approaches the sample 12, though the cantilever 24 is not displaced at all. Therefore, if the structure is arranged as described above such that the operation of the coarse adjustment mechanism 6 is interrupted when the output from the optical displacement sensor 4 has exceeded 0V, interference of leaked light, other noise and the like may cause the output from the optical displacement sensor 4 to exceed 0V. Therefore, the movement of the coarse adjustment mechanism 6 is stopped during the approaching operation. Therefore, influences of the interference of leaked light, noise and the like must be considered to set the output from the sensor 4 to be an appropriate value. Even if the output of the sensor 4 is set at 0V to eliminate the interference of the leaking light, noise and the like, there will arise the following problem.

FIG. 4B is an enlarged view of the section surrounded by a dashed-line circle shown in FIG. 4A. As shown in FIG. 4B, the probe 22 comes in contact with the surface of the sample 12 at point A during the approaching operation. In this case, the output from the sensor is still 0V or lower. While the member 5 remains in contact with the sample 12, the coarse adjustment mechanism 6 keeps moving downwards to point B where the output of the sensor 4 changes to 0V or more. Thus, the cantilever 24 is bent upwards and the force applied from the probe 22 to the sample 12 continuously increases.

As the sensor 4 moves from point A to point B, its output increases along a certain slope (see f in FIG. 4B). The slope can be determined from the gain of the sensor 4 and the speed of the mechanism 6 moving downwards.

The approaching operation will now be described in detail.

Referring to FIG. 1, the angle of the cantilever 24 is, before the approaching operation is performed, adjusted in such a manner that output voltage Sz from the probe displacement signal detection section 32 is set to be –0.1V including considered influence of noise. That is, the reflected light beams from the rear side of the cantilever 24 are located on the bisectioned light receiving device 28. The angle of the reflecting mirror 20 is adjusted so that the reflecting mirror 20 is reliably irradiated with the light beams so that the light beam are formed into incident light beams 52. Thus, a spot of the reflected light beam 54 from the cantilever 24 is adjusted to be shifted to the lower half surface of the bisectioning line of the bisectioned light receiving device 28. Since the output voltage from the bisectioned light receiving device 28 is in prosection to the light receiving area, the laser beam spot is shifted to the lower half surface of the bisectioned light receiving device 28. Therefore, the voltage of the output signal Sz from the optical displacement sensor 4 is smaller than 0V.

When the probe 22 of the cantilever 24 and the sample 12, which are apart from each other as shown in FIG. 5A, are caused to approach each other, commencement of the approaching operation results in a turning-on command being transferred from the approaching section 34 to the motor driver 38. As a result, the motor 8 of the coarse adjustment mechanism 6 is turned on so that the coarse adjustment mechanism 6 is moved downwards. At this time, the output Sz from the optical displacement sensor 4 is about –0.1V to –0.2V, while applied voltage Va of the piezoelectric member 2 is 0V.

Then, the probe 22 of the cantilever 24 is caused to approach the surface of the sample 12. When the probe 22 has been brought into contact with the surface of the sample 12, the cantilever 24 is urged upwards, as shown in FIG. 5B.

Therefore, the spot of the reflected light beam 54 from the rear side of the cantilever 24 is shifted to the upper surface of the bisectioned light receiving device 28.

When the voltage of the output signal Sz from the displacement amount detection section of the probe 22 of the cantilever 24 has therefore been raised to, for example, 0V, a turning-off signal is supplied from the approaching section 34 to the motor driver 38 so that the motor 8 of the coarse adjustment mechanism 6 is stopped and, therefore, the operation of the coarse adjustment mechanism 6 is interrupted (applied voltage Va to the piezoelectric member 2 is 0V at this time).

Simultaneously, for example, voltage of (Va=) –100V is applied from the approaching section 34 in such a manner that the piezoelectric member 2 is contracted into the Z direction, as shown in FIG. 5C. As a result, the piezoelectric member 2 is contracted in the direction Z so that the piezoelectric member 2 is moved apart from the surface of the sample 12 for about 1 $\mu$m. As a result of the above-mentioned process, the surface of the sample 12 can automatically be brought into contact with the center of the movable area for the piezoelectric member 2.

The cantilever 24 is a small part made of a thin semiconductor film having a length of 100 $\mu$m to 200 $\mu$m, a width of 50 $\mu$m and a thickness of 0.4 $\mu$m to 4 $\mu$m. The cantilever 24 has a sharp projection (the probe 22) at the free end thereof. The probe 22 at the free end has a short length of about 6 $\mu$m and must be sharpened satisfactorily to improve the resolution in the measuring operation.

The leading end of the probe 22 or the cantilever 24 is formed into a very thin shape having a small diameter of several nm to 10 nm. Therefore, if external force acts on the probe 22, the leading end can be broken or chipped. In particular, the kinetic energy the sample 12 applies to the probe 22 during the approaching operation is $mV^2/2$. The kinetic energy the probe 22 applies to the sample 12 is also $mV^2/2$. Note that m is the overall weight of the coarse adjustment mechanism 6, the body of the optical displacement sensor 4 and the piezoelectric memeber 2. Since the overall weight m is considerably heavy, the probe 22 and the sample 12 will be damaged badly when they contact each other. Since the kinetic energy of $mV^2/2$ is in prosection to the square of the relative speed of the probe 22 and the sample 12, the approaching speed when the probe 22 and the sample 12 are brought into contact with each other is needed to be lowered considerably.

As indicated above, the output of the sensor 4 exceeds 0V even if the cantilever 24 does not contact the sample 12 as illustrated in FIG. 4B. This is a problematical phenomenon. To avoid the phenomenon, the output of the displacement sensor 4 is set at a negative value before the probe 22 is made to approach the sample 12. Consequently, the probe 22 keeps pushing the sample 12 to change the output of the sensor 4 to 0V after contacting the sample 12, possibly damaging the sample 12.

In the example shown in FIG. 4B, the cantilever 24 is bent upwards for a distance of about 36 nm until the probe 22 is brought into contact with the surface of the sample 12 and then the probe 22 is stopped. In a case where the spring constant of the cantilever 24 is 1N/m, force of about 360 nN is applied from the probe 22 to the sample 12. In another case where the spring constant of the cantilever 24 is 100N/m, the probe 22 applies force of 3600 nN, which is about ten times, to the sample 12. Since the foregoing force is considerably larger than the interatomic force, there is a risk that the sample 12 can be damaged.

Therefore, the risk of damage to the sample caused by the probe must be reduced by lowering the speed of contact between the probe 22 and the surface of the sample 12. Moreover, a mechanism is required to interrupt the operation of the coarse adjustment mechanism for moving the probe downward as much and as quickly as possible from the moment at which the probe is been brought into contact with the surface of the sample.

SUMMARY OF THE INVENTION

Accordingly, an object of the present invention is to provide an approaching device of a scanning probe microscope, which can protect the probe of a cantilever and a sample, which is free from the influence of leaked light from the cantilever and with which the time required to complete the approaching operation can be shortened by utilizing the leaked light.

Accordingly, an object of the present invention is to provide an approaching device of a scanning probe microscope comprising: a probe disposed opposite to a sample; a cantilever having a proximal end portion and a free end portion which holds the probe; scanning means for relatively moving the probe and the sample; displacement detection means for optically detecting displacement of the cantilever realized on the basis of force acting between the probe and the sample; approaching means for relatively changing the distance between the probe and the sample so as to cause the probe and the sample to approach each other; and movement interruption means which detects the distance between the probe and the sample in accordance with change in a displacement signal output from the displacement detection means so as to interrupt movement of the approaching means.

Another object of the present invention is to provide an approaching device of a scanning probe microscope comprising: a probe disposed opposite to a sample; a cantilever having a proximal end portion and a free end portion which holds the probe; scanning means for relatively moving the probe and the sample; displacement detection means for optically detecting displacement of the cantilever realized on the basis of force acting between the probe and the sample; approaching means for relatively changing the distance between the probe and the sample so as to cause the probe and the sample to approach each other; and movement-speed switch means for switching movement speed of the approaching means in accordance with a displacement signal output from the displacement detection means.

Another object of the present invention is to provide an approaching device of a scanning probe microscope comprising: a probe disposed opposite to a sample; a cantilever having a proximal end portion and a free end portion which holds the probe; scanning means for relatively moving the probe and the sample; displacement detection means for optically detecting displacement of the cantilever realized on the basis of force acting between the probe and the sample, the displacement detection means including a light source for irradiating the cantilever with laser beams and light detection means for detecting light beams reflected by the cantilever; approaching means for relatively changing the distance between the probe and the sample so as to cause the probe and the sample to approach each other; sample reflection light detection means for detecting, among laser beams with which the cantilever are irradiated, light beams which have reached the sample and reflected by the surface of the sample; and movement-speed switch means for switching the movement speed of the approaching means in accordance with an output signal from the sample reflection light detection means.

In the present invention, the probe displacement signal detection section uses characteristic of change in reflected light on the light receiving device except a section of light reflected by the rear side of the cantilever to calculate the distance from the probe of the cantilever to the sample. The approaching speed switch mechanism enables a high speed approaching operation to be performed when the probe is positioned apart from the sample. When the probe has approached the sample, the probe approaches the sample at low approaching speed. An output signal from the probe displacement signal detection section is differentiated, and change in the differentiated value is used to determine whether the probe is in contact with the surface of the sample. In accordance with a result of the determination, the approaching operation is interrupted, if necessary. As a result, the time required to complete the approaching operation can be shortened. Since the relative speed between the sample and the probe can be reduced, force applied to the probe at a moment of the contact can reduced. Since the time for which the probe and the sample are in contact with each other can be shortened and, thus, force applied from the probe to the sample can be reduced, the tip of the probe and the sample can be protected from being damaged. Since the sharpness of the tip of the probe can be maintained, high resolution measurement can be performed.

In the present invention, a light receiving device is provided which detects leaked laser beams reflected from the sample and transmitted light. Then, change in the output from the light receiving device denoting the reflected leaked light and transmitted light is detected by the leaked light detection and calculating section when the approaching operation is performed so that the distance from the probe of the cantilever to the sample is calculated. In accordance with the distance from the probe to the sample, the approaching speed switch section of the leaked light detection and operation section enables a high speed approaching operation to be performed when the probe is positioned apart from the sample. When the probe has approached the sample, the probe approaches the sample at low approaching speed. As a result, the time required to complete the approaching operation can be shortened. Moreover, force, which is applied from the sample to the probe, can be reduced when the sample and the probe are brought into contact with each other. Thus, the tip of the probe and the sample can satisfactorily be protected from being damaged. Since the sharpness of the tip of the probe can be maintained, high resolution measurement can be performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6 is a block diagram showing the structure of a first embodiment of an approaching device of a scanning probe microscope according to the present invention;

FIG. 9 is combination of a projection view of the surface of the bisectioned light receiving device, a probe displacement signal change detection mechanism and surrounding sections according to a first embodiment;

FIG. 10A is a graph showing the waveform of an output from the bisectioned light receiving device according to the first embodiment, FIG. 10B is a graph showing the waveform of an output from a differentiation operation section according to the first embodiment;

FIG. 11 is a flow chart of an approaching operation of a scanning probe microscope according to the first embodiment;

FIG. 12 is a block diagram showing the structure of a second embodiment of the approaching device of the scanning probe microscope according to the present invention;

FIG. 13A is a graph showing the waveform of an output from a probe displacement signal detection section according to the second embodiment, FIG. 13B is a graph showing the waveform of an output from a differentiation operation section according to the second embodiment;

FIG. 15 is a block diagram showing the structure of a third embodiment of the approaching device of the scanning probe microscope according to the present invention;

FIG. 20 is a structural view showing the cantilever displacement detection system of the scanning probe microscope shown in FIG. 19;

FIG. 21 is combination of a projection view of the surface of the bisectioned light receiving device, the probe displacement signal change detection operation section and surrounding sections according to the fourth embodiment;

FIG. 22 is a graph showing the waveform of an output from the leaked light signal detection and operation section shown in FIG. 19;

FIG. 23 is a block diagram showing the structure of the approaching device of the scanning probe microscope according to a fifth embodiment;

FIG. 24 is a structural view showing the cantilever displacement detection system of the scanning probe microscope shown in FIG. 23;

FIG. 25 is combination of a projection view of the surface of the bisectioned light receiving device, the leaked light signal detection and operation section and surrounding sections according to the fifth embodiment;

FIG. 26 is a graph showing the waveform of an output from the leaked light signal detection and operation section with respect to the distance from the sample to the probe during the approaching operation;

FIG. 28 is combination of a projection view of the surface of the bisectioned light receiving device, the probe displacement signal change detection mechanism and surrounding sections according to the sixth embodiment;

FIG. 29A is a graph showing the waveform of an output from the bisectioned light receiving device according to the sixth embodiment; and FIG. 29B is a graph showing the waveform of an output from a differentiation operation section according to the sixth embodiment.

DETAILED DESCRIPTION OF THE PREFERRED EMBODIMENTS

Preferred embodiments of the present invention will now be described with reference to the drawings.

Initially, referring to FIGS. 6 to 11, a first embodiment of the present invention will now be described.

Figure 7:
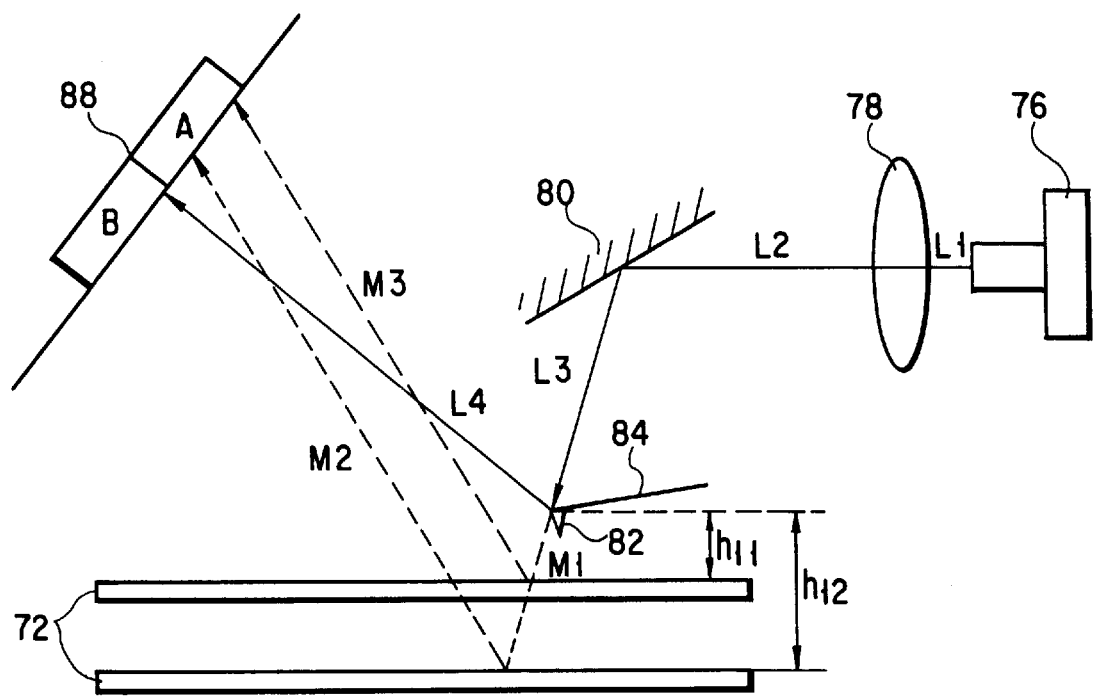
FIG. 7 is a diagram for explaining an optical lever method employed in the cantilever displacement detection system shown in FIG. 6.
Figure 8:
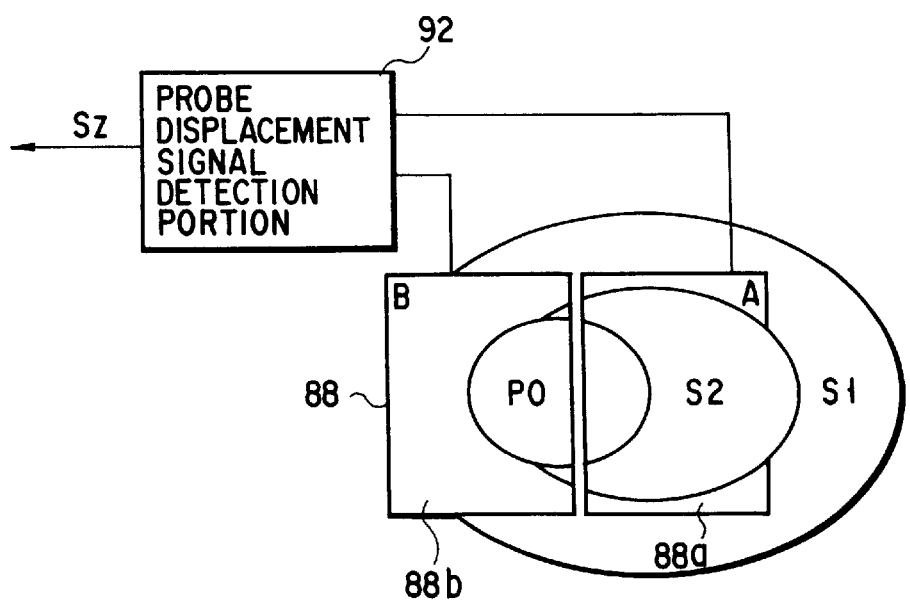
FIG. 8 is a projection view of a reflected light spot from the rear side of the cantilever shown in FIG. 6 and leaked light spot on a bisectioned light receiving device.

FIG. 6 is a block diagram showing the structure of a first embodiment of an approaching device of a scanning probe microscope according to the present invention. FIG. 7 is a diagram for explaining an optical lever method employed in a system for detecting displacement of a cantilever. FIG. 8 is a projection view of a reflected light spot from the rear side of the cantilever and the leaked light spot on the surface of a bisectioned light receiving device. FIG. 9 is a view of combination of a projection view of the bisectioned light receiving device, a probe displacement signal change detection mechanism and surrounding sections according to the first embodiment. FIG. 10 is a graph showing output waveforms from the bisectioned light receiving device and a differentiation operation section.

Referring to FIG. 6, an optical displacement sensor 64 employing the optical lever method is secured to the free end of a piezoelectric member 62. A coarse adjustment mechanism 66 is attached to another end of the piezoelectric member 62 so that the coarse adjustment mechanism 66 is vertically moved along a stand 70 when a motor 68 is rotated. A sample frame 74 for holding a sample 72 to be measured is provided on the stand 70.

The optical displacement sensor 64 includes a laser diode (LD) 76, a converging lens 78 for converging laser beams, a reflecting mirror 80, a cantilever 84 disposed at the position of the focal point of the converging lens 78 and having a probe 82 at the free end thereof, a support frame 86 for holding the cantilever 84 and a bisectioned light receiving device (PD) 88 for receiving light beams reflected by the rear side of the cantilever 84. The cantilever 84 is attached to be inclined from the horizon of the support frame 86 by an angular degree of, for example, about 10°.

A cantilever probe displacement signal detection section 92 measures the displacement of the probe 82 of the cantilever 84 by using the optical displacement sensor 64 employing the optical lever method. An output from the probe displacement signal detection section 92 is supplied to an approaching section 94, a probe displacement signal change detection mechanism 96 and a Z-servo control section 98. The approaching section 94 rotates the motor 68 through a motor driver 100.

The approaching section 94, the Z-servo control section 98 and an XY scanning section 104 are connected to a work station 102. Moreover, an image display unit 106 for storing transferred measurement data, forming a 3D image of the projection and pit information of the surface of the sample and analyzing information of the surface of the sample is connected to the work station 102. The Z-servo control section 98 and the XY scanning section 104 control the direction of movement of the piezoelectric member 62 through corresponding high voltage (HV) amplifiers 108 and 110.

The probe displacement signal change detection mechanism 96 consists of a differentiation operation section 114 for differentiating signal Sz supplied from the probe displacement signal detection section 92, a threshold determination section 116 for comparing an output signal from the differentiation operation portion 114 with a predetermined threshold and an approach interruption section 118 for issuing an interruption command to the motor driver 100 in accordance with a determination performed by the threshold determination section 116.

Reference numeral 120 represents an incident light beam and 124 represents a leaked light beam which is not reflected by the cantilever 84.

Figure 1:
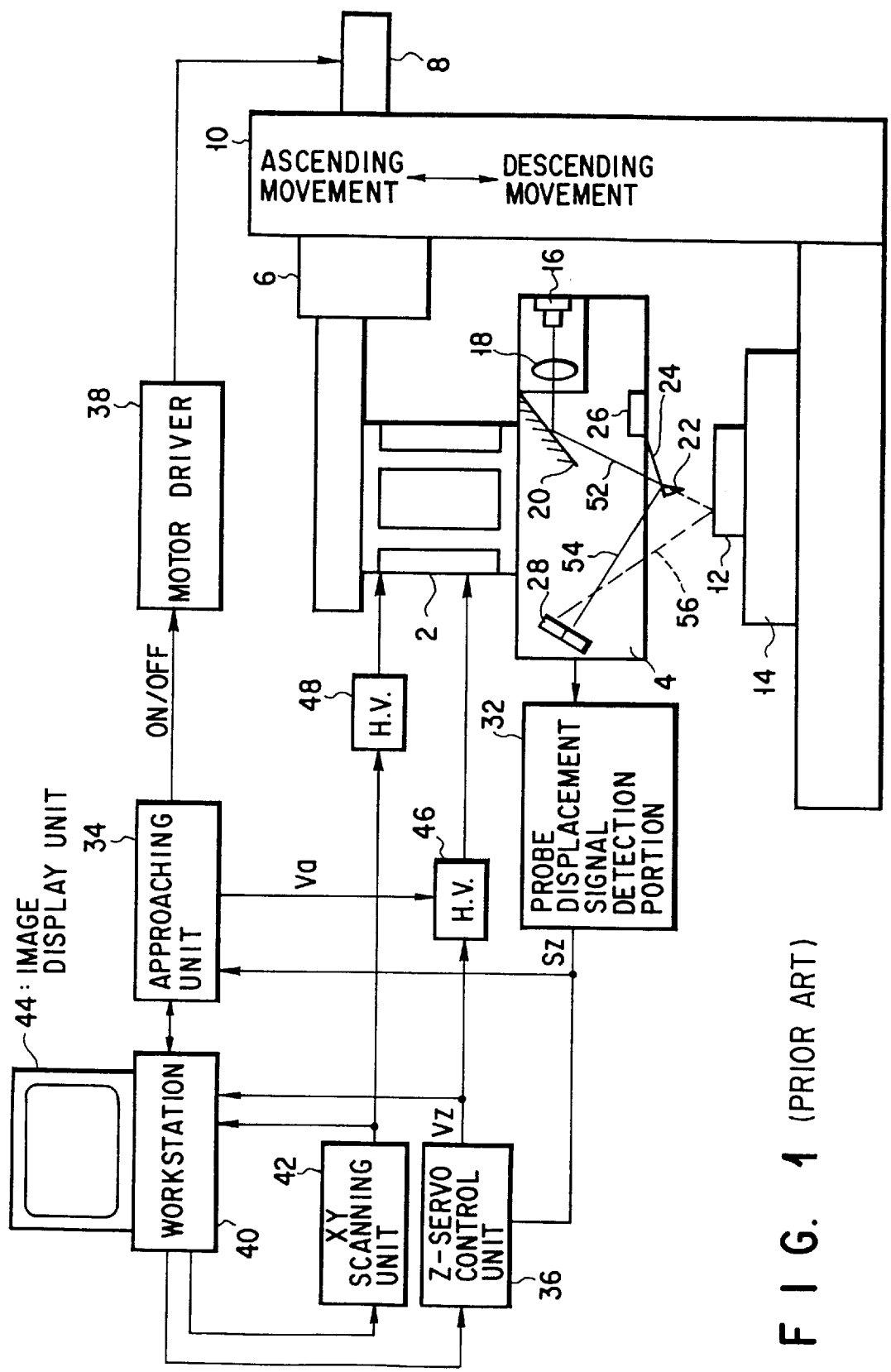
FIG. 1 is a block diagram showing an example of the structure of a conventional scanning probe microscope employing an optical lever method.
Figure 2:
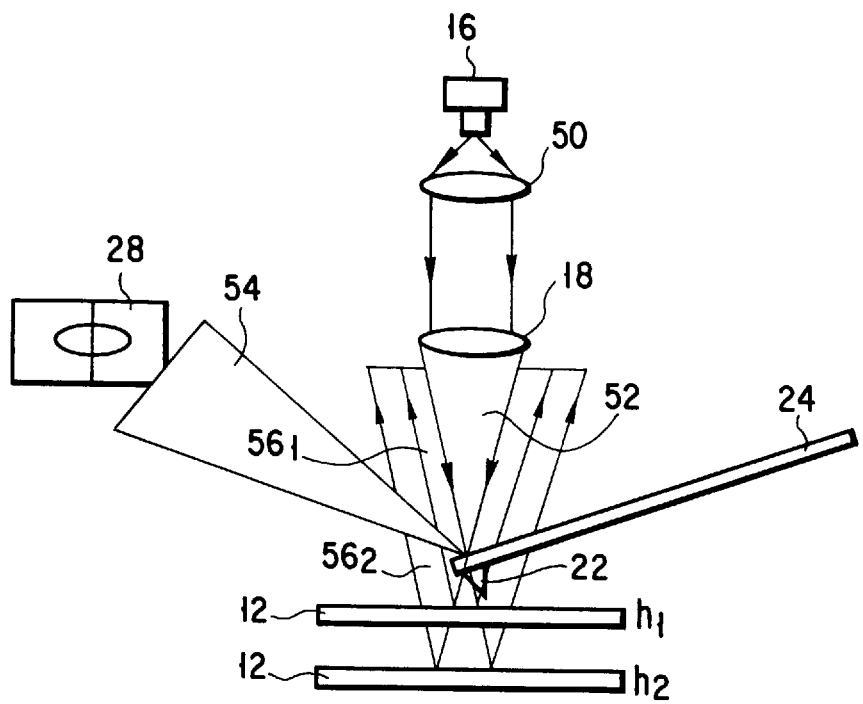
FIG. 2 is a diagram showing a method adapted to a conventional scanning probe microscope and arranged such that light beams are made incident from right above a cantilever.
Figure 3:
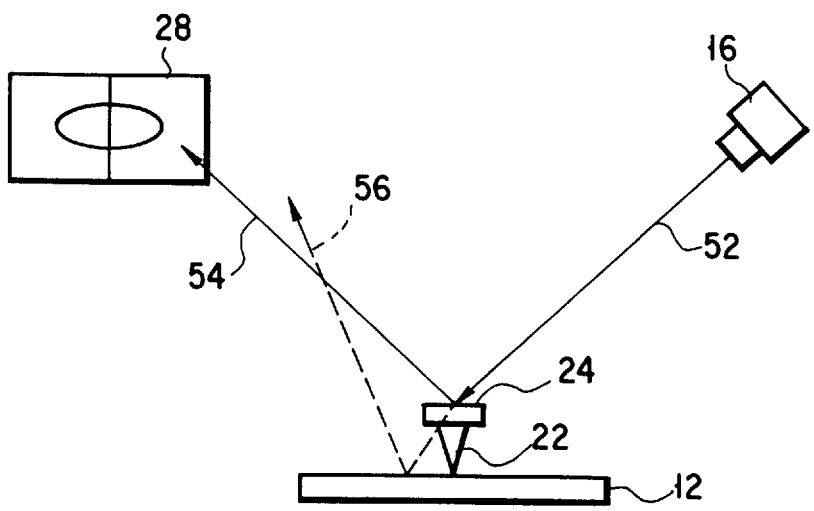
FIG. 3 is a diagram showing a method adapted to the conventional scanning probe microscope and arranged such that light beams are made incident from a diagonally upper section of the cantilever.

As described above, FIG. 6 shows the structure in which the probe displacement signal change detection mechanism 96 is added to the structure shown in FIG. 1.

The operation of the scanning probe microscope will be explained in conjunction with the operating principle of an atomic force microscope (AFM).

The Z-servo control section 98 performs feedback control, maintaining the tip of the probe 82 spaced apart from the sample 72 at a specific distance. More specifically, the section 98 applies a Z control voltage Vz to the piezoelectric member 62 through the high voltage amplifier 108, thereby maintaining a constant interatomic force between the sample 72 and the tip of the probe 82. While moving the probe 82 in the Z direction (the vertical direction in FIG. 6), an XY scanning signal transmitted from the XY scanning section 104 is supplied to the piezoelectric member 62 to scan the 2D direction. Information obtained by superposing the Z control signal Vz on the XY scanning signal, that is, obtained information about projections and pits of the sample is transferred to the image display unit 106 through the work station 102.

The interatomic force acting between the sample 72 and the tip of the probe 82 is maintained constant in the following manner.

The interatomic force bends the cantilever 84 holding the probe 82. The amount of bending (i.e., displacement) is detected by a cantilever-displacement detecting system (described later). The amount of bending is maintained by means of feedback control, maintaining the interatomic force acting between the sample 72 and the tip of the probe 82.

The optical lever method employed in the cantilever displacement detection system will now be described.

As shown in FIG. 7, the displacement sensor 64 includes the laser diode 76 and the converging lens 78 in such a manner that their optical axes form a straight line. Light beams L1 emitted from the laser diode 76 are allowed to pass through the converging lens 78 so that the light beams L1 are converged. Converged light beams L2 are reflected by the reflecting mirror 80. The cantilever 84 is disposed at the position of the focal point of the reflecting mirror 80. The cantilever 84 is attached to be inclined from the horizon of the support frame 86 by an angular degree of, for example, about 10°.

The light beam L2 is reflected by the reflecting mirror 80 so that light beam L3 is generated. The light beam L3 is made incident upon the rear side of the cantilever 84, and then again made incident by the cantilever 84 so that reflected light beam L4 from the cantilever 84 is made incident upon the bisectioned light receiving device 88.

Prior to performing the approaching operation, positioning of the reflected light beam L4 from the rear side of the cantilever 84 on the bisectioned light receiving device 88 consisting of side A ($88a$) and side B ($88b$) is performed, as shown in FIG. 8.

The light beam L4 is adjusted by changing the angle of the reflecting mirror 80 in such a manner that the incident light beam L2 is reliably applied to the reflecting mirror 80. Moreover, spot P0 of the reflected light beam L4 from the cantilever 84 is shifted to the side B ($88b$) of the bisectioned light receiving device 88.

The voltage output from the device 88 is obtained by subtracting the output from the side B ($88b$) from the output from the side A ($88a$). This voltage is proportional to the light receiving area. The spot of the light beam is shifted to the side B ($88b$) of the bisectioned light receiving device 88. Therefore, the voltage of the output signal Sz from the probe displacement signal detection section 92 is 0V or less, for example −0.1 to −0.2V.

As shown in FIG. 7, the light beam L3 is directly made incident upon the rear side of the cantilever 84. Moreover, leaked light M1 of the light beam L3 is generated. When the sample 72 and the probe 82 at the tip of the cantilever 84 are apart from each other (for example, when the sample 72 is positioned apart for distance $h_{12}$), the reflected light beam M2 of the leaked laser beam from the surface of the sample 72 is thickened so that spot S1 (see FIG. 8) is formed on the light receiving device 88. As the distance from the sample 72 to the probe 82 is shortened, the diameter of the reflected light beam M2 is reduced and the leaked light is intensified. For example, spot S2 of the reflected light beam M3 of leaked light is formed on the bisectioned light receiving device 88 when the distance is $h_{11}$.

The operation of the detection mechanism 96 for detecting changes in the probe displacement signal will be described, with reference to FIGS. 9 and 10.

Figure 4A:
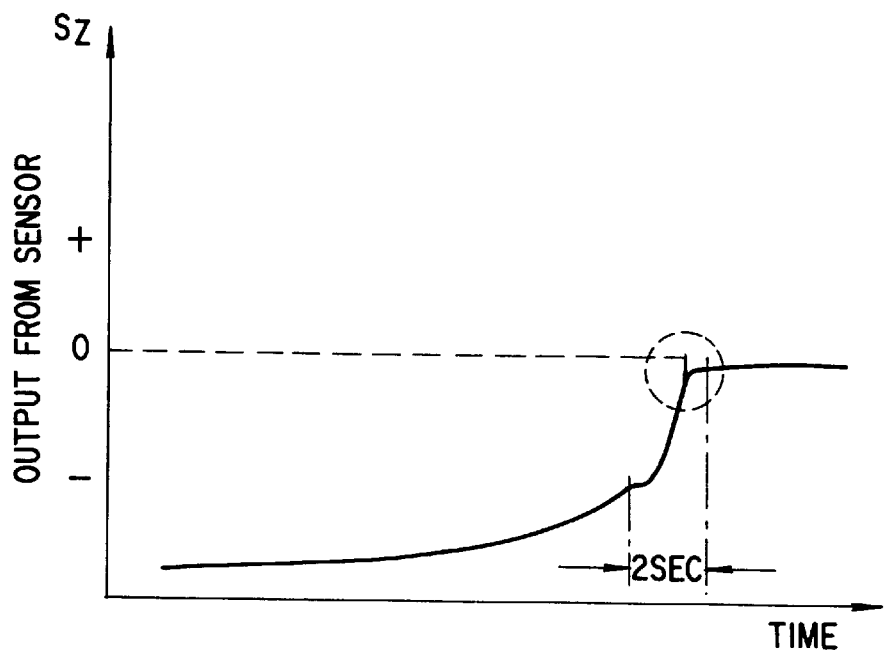
FIG. 4A is a characteristic graph showing the waveform of an output from a displacement sensor when the approaching operation is performed.
Figure 4B:
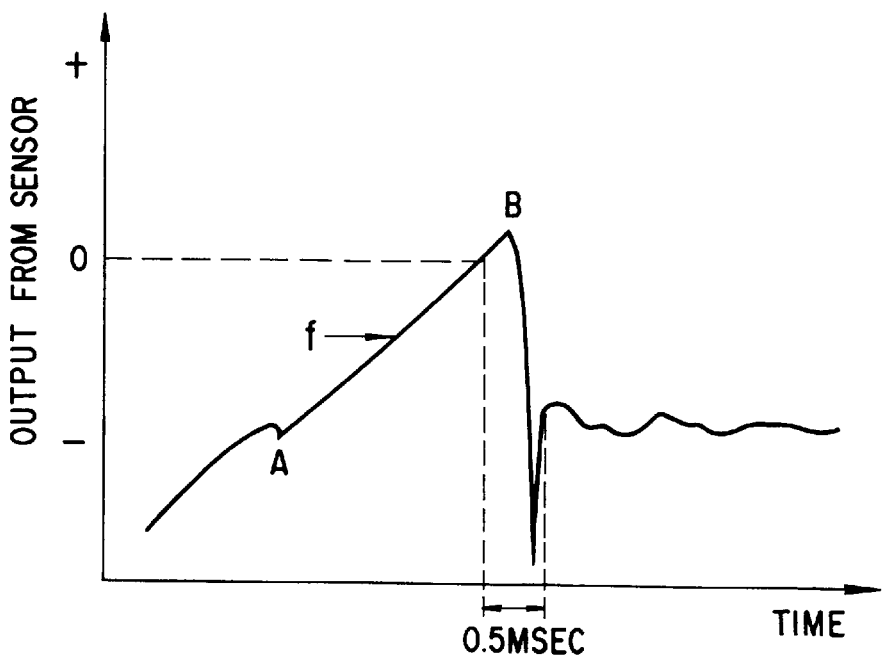
FIG. 4B is a graph of enlargement of a section surrounded by a short-dashed circle shown in FIG. 4A.
Figure 5C:
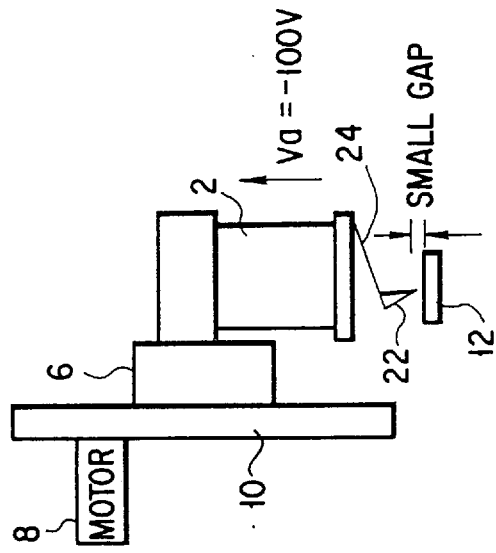
FIGS. 5A to 5C are diagrams for explaining the approaching operation of the conventional scanning probe microscope.
Figure 5B:
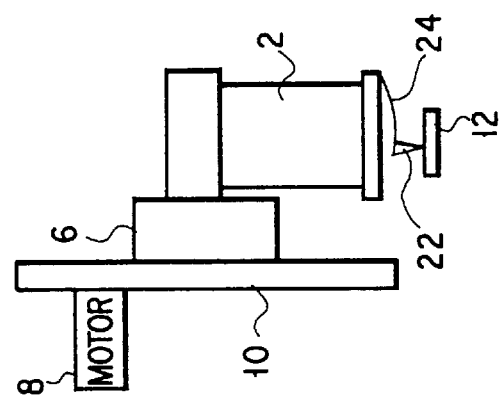
Figure 5A:
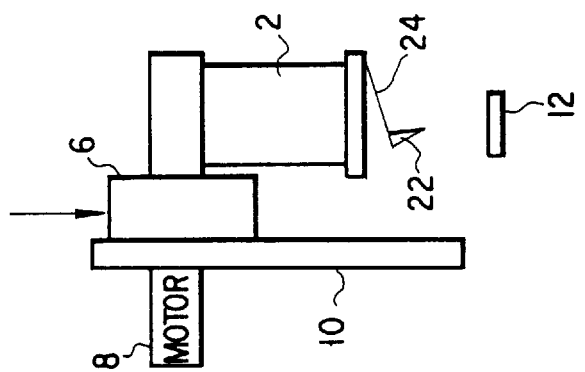

In the probe displacement signal change detection mechanism 96, the signal Sz from the probe displacement signal detection section 92 is supplied to the differentiation operation section 114. The differentiation operation section 114 differentiates the signal Sz and the differentiated value is supplied to the threshold determination section 116. FIG. 10A illustrates how the signal Sz changes during the approaching operation. The curve shown in FIG. 10A extends over the same range as the curve shown in FIG. 4A which represents the changes in the sensor output. That part ($t_1$–$t_2$) of the curve which shows how the signal Sz changes when the probe 82 contacts the sample 72 is emphasized for illustrative purpose. This part ($t_1$–$t_2$) corresponds to the curve connecting points A and B shown in FIG. 4B. In the threshold determination section 116, output signal d (Sz)/dt from the differentiation operation section 114 is subjected to a comparison with predetermined threshold $ref_1$ selected from values obtained from experiments or the like performed before the measurement, as shown in FIG. 10B. When the output signal d (Sz)/dt is larger than the threshold $ref_1$, an interruption command is issued from the approach interruption section 118 to the motor driver 100 so that the approaching operation is interrupted.

That is, the voltage of the output signal Sz from the displacement sensor 64 is $t_1$ to $t_2$ shown in FIGS. 10A and 10B in a period in which the probe 82 of the cantilever 84 is in contact with the surface of the sample 72. That is, the probe 82 is in contact with the surface of the sample 72 in a period from $t_1$ to $t_2$.

As seen from FIG. 10A, the coarse adjustment mechanism 66 keeps moving downwards until the output signal Sz of the sensor 64 reaches 0V. While the mechanism 66 is moving downwards, the output voltage of the sensor 64 increases along a specific slope. The slope k is determined by the gain of the displacement sensor 64 and the descending movement speed of the coarse adjustment mechanism 66. The slope k can be obtained from the peculiar characteristic of the apparatus. For example, a value $ref_1$ is predetermined which is less than the slope k of the line connecting points A and B shown in FIG. 4B.

A value somewhat smaller than the obtained slope is previously set as threshold $ref_1$ of the characteristic d (Sz)/dt shown in FIG. 10B. If the threshold $ref_1$ is larger than the value of k, the threshold determination section 116 cannot be operated normally. Therefore, setting is performed such that $0 < ref_1 < k$.

How the approaching operation is performed in the scanning probe microscope will be explained with reference to the flow chart of FIG. 11.

The output d (Sz)/dt from the differentiation operation section 114 is supplied to the threshold determination section 116 at the moment $t_1$ at which the probe 82 of the cantilever 84 is brought into contact with the surface of the sample 72. The threshold determination section 116 determines whether the output value from the differentiation operation section 114 is larger than the predetermined threshold $ref_1$ (step S1).

If a determination is performed that the output value is larger than the threshold $ref_1$, an interruption command is issued from the approach interruption portion 118 to the motor driver 100 so that the operation of the coarse adjustment mechanism 66 is interrupted. Simultaneously, voltage of, for example, –100V, is supplied from the approach interruption section 118 to contract the piezoelectric member 62 in the Z direction (step S2). As a result, the piezoelectric member 62 is contracted in the Z direction by about 1 µm, for example, so that the probe 82 is moved apart from the surface of the sample 72. The voltage applied to the member 62 before the approaching operation is 0V as in the conventional scanning probe microscope.

As a result of the above-mentioned process, the surface of the sample 72 can automatically be brought into contact with the center of the movable range for the piezoelectric member 62.

Although the first embodiment has been described about the approaching operation to be performed by the scanning probe microscope, the present invention is not limited to this. For example, the present invention may be employed when a force curve is produced to examine the hardness of the sample 72 or the surface characteristic.

As described above, the operation for causing the probe of the cantilever of the scanning probe microscope to approach the sample can be performed such that the output signal from the probe displacement signal detection section is differentiated, and change in the result of the differentiating operation is used to quickly stop the coarse adjustment mechanism after the probe has been brought into contact with the surface of the sample. As a result, the time in which the probe is in contact with the sample can be shortened and the force applied from the probe to the sample can be reduced. Therefore, the tip of the probe and the sample can satisfactorily be protected from being damaged. Since the sharpness of the tip of the probe can be maintained, measurement can be performed with excellent resolution.

Moreover, the approaching operation can quickly be completed in such a manner that the probe and the sample are satisfactorily protected from being damaged.

Figure 14:
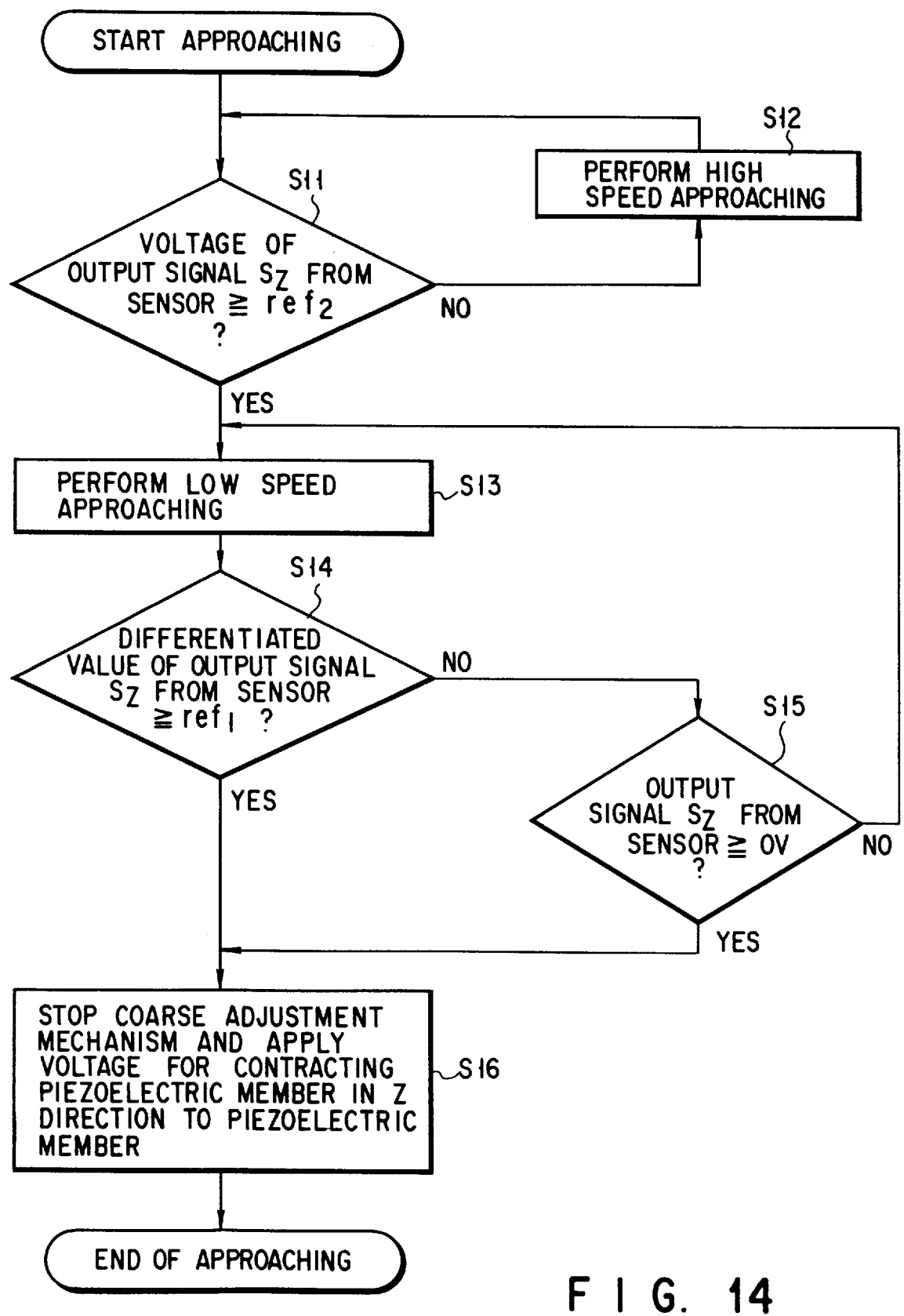
FIG. 14 is a flow chart of the approaching operation of the scanning probe microscope according to the second embodiment.

Referring to FIGS. 12 to 14, a second embodiment of the present invention will now be described.

FIG. 12 is a block diagram showing the structure of a second embodiment of the approaching device of the scanning probe microscope according to the present invention. The structure shown in FIG. 12 has the arrangement such that an approaching speed switch section is added to the probe displacement signal detection section of the scanning probe microscope according to the first embodiment shown in FIG. 6. Therefore, description will be performed about sections different from the first embodiment such that the same elements are given the same reference numerals and the same elements are omitted from description.

FIGS. 13A and 13B are graphs showing the waveform of an output from the probe displacement signal detection section and that from the differentiation operation section according to the second embodiment. FIG. 14 is a flow chart for explaining the approaching operation according to the second embodiment.

A probe displacement signal change detection mechanism 130 consists of the differentiation operation section 114, the threshold determination section 116, the approach interruption section 118 and an approaching speed switch section 132 for switching the speed of the motor driver 100 in accordance with the determination performed by the threshold determination section 116.

In the probe displacement signal change detection mechanism 130, signal Sz as shown in FIG. 13A is supplied from the probe displacement signal detection section 92 to the differentiation operation section 114. The differentiation operation section 114 differentiates the signal Sz and supplies a result of the differentiating operation to the threshold determination section 116. The threshold determination section 116 compares the output d (Sz)/dt from the differentiation operation section 114 with a predetermined threshold $ref_2$ (step S11).

That is, if the output signal d (Sz)/dt is smaller than the threshold $ref_2$, a high speed approaching operation is performed. Therefore, the approaching speed switch section 132 issues a high speed operation command to the motor driver 100 (step S12). As a result, the coarse adjustment mechanism 66 is quickly moved downwards from an upper position in a period from 0 to $t_0$ when viewed in FIG. 12 so that the probe 82 of the cantilever 84 is caused to approach the surface of the sample 72.

If the output signal d (Sz)/dt from the differentiation operation section 114 exceeds the predetermined threshold $ref_2$, a slow speed operation command is issued from the approaching speed switch section 132 to the motor driver 100. As described above, the mode is switched to the low speed approaching operation by the approaching speed switch section 132 (step S13). At this time, the probe 82 is caused to approach the sample 72 at very low speed in a period from $t_0$ to $t_1$.

Then, the output d (Sz)/dt from the differentiation operation section 114 is supplied to the threshold determination section 116 at moment $t_1$ at which the probe 82 of the cantilever 84 is brought into contact with the surface of the sample 72. The threshold determination section 116 determines whether the output value from the differentiation operation section 114 is larger than the predetermined threshold $ref_1$ (step S14).

If the output value is not larger than the threshold $ref_1$, whether the level of the output signal Sz is higher than 0V is determined (step S15). If the level of the output signal Sz is not higher than 0V, the operation returns to step S13 so that the low speed approaching operation is again performed.

If a determination is performed in step S14 that the output value is larger than the threshold $ref_1$, or if the determination is performed in step S15 that the level of the output signal Sz is higher than 0V, an interruption command is issued from the approach interruption section 118 to the motor driver 100 so that the operation of the coarse adjustment mechanism 66 is interrupted. Simultaneously, voltage of, for example, −100V is applied from the approaching section 94 in such a manner that the piezoelectric member 62 is contracted in the Z direction. Thus, the piezoelectric member 62 is contracted in the Z direction by about 1 μm, for example, so that the probe 82 is moved apart from the surface of the sample 72 (step S16).

As a result of the above-mentioned process, the surface of the sample can automatically be brought into contact with the center of the movable range for the piezoelectric member.

The foregoing approaching operation of the scanning probe microscope is able to shorten the time required to complete the approaching operation. Moreover, the relative speed between the sample and the probe can be lowered to reduce the force which is applied to the probe at a moment at which the probe is brought into contact with the surface of the sample. Moreover, the time for which the probe and the sample is in contact with each other can be shortened so that the force which is applied from the probe to the sample is reduced. As a result, the tip of the probe and the sample can satisfactorily be protected from being damaged. Thus, the sharpness of the tip of the probe can be maintained so that high resolution measurement is performed.

Moreover, a quick approaching operation can be performed in such a manner that the probe and the sample satisfactorily are protected from being damaged.

Referring to FIGS. 15 to 18, a third embodiment of the present invention will now be described.

Figure 16:
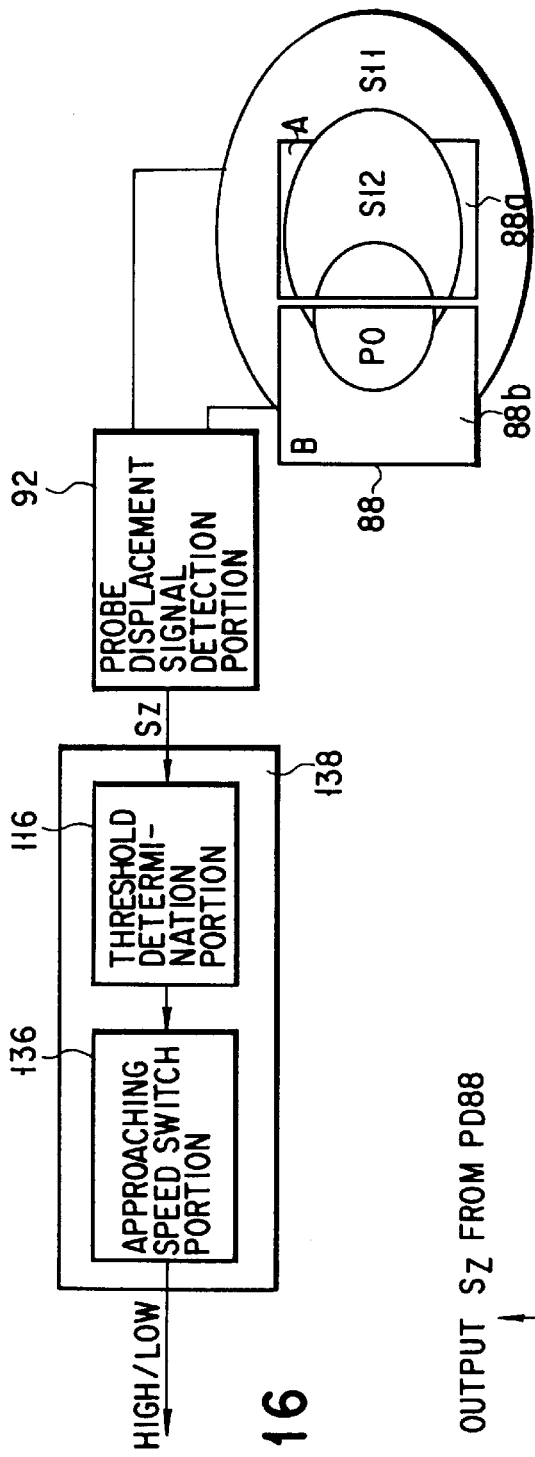
FIG. 16 is combination of a projection view of the surface of the bisectioned light receiving device, the probe displacement signal change detection mechanism and surrounding sections according to a third embodiment.
Figure 17:
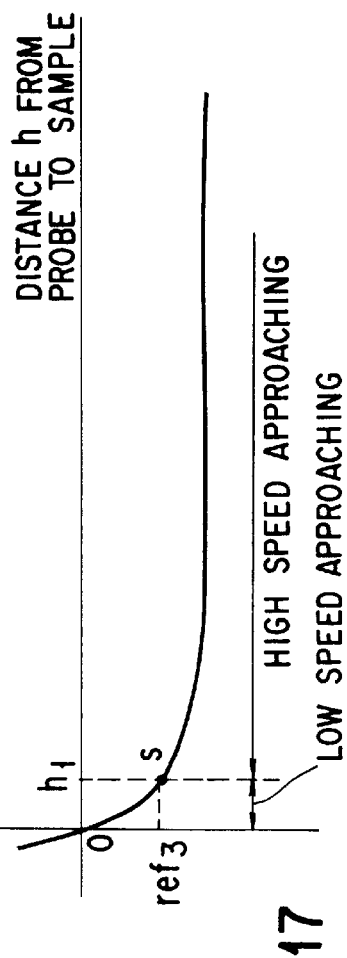
FIG. 17 is a graph showing the waveform of the output from a probe displacement signal detection section according to the third embodiment.

FIG. 15 is a block diagram showing a third embodiment of the approaching device of the scanning probe microscope according to the present invention. FIG. 16 is a combination of a projection view of the bisectioned light receiving device, the probe displacement signal detection section and surrounding sections according to the third embodiment. FIG. 17 is a graph showing the waveform of an output from the probe displacement signal detection section according to the third embodiment.

The structure of the scanning probe microscope shown in FIG. 15 has an arrangement such that a probe displacement signal change detection mechanism 138 consisting of the threshold determination section 116 and an approaching speed switch section 136 is provided in place of the probe displacement signal change detection mechanism 96 of the scanning probe microscope according to the first embodiment shown in FIG. 6. Therefore, description will be made about only sections different from the first embodiment.

Figure 18:
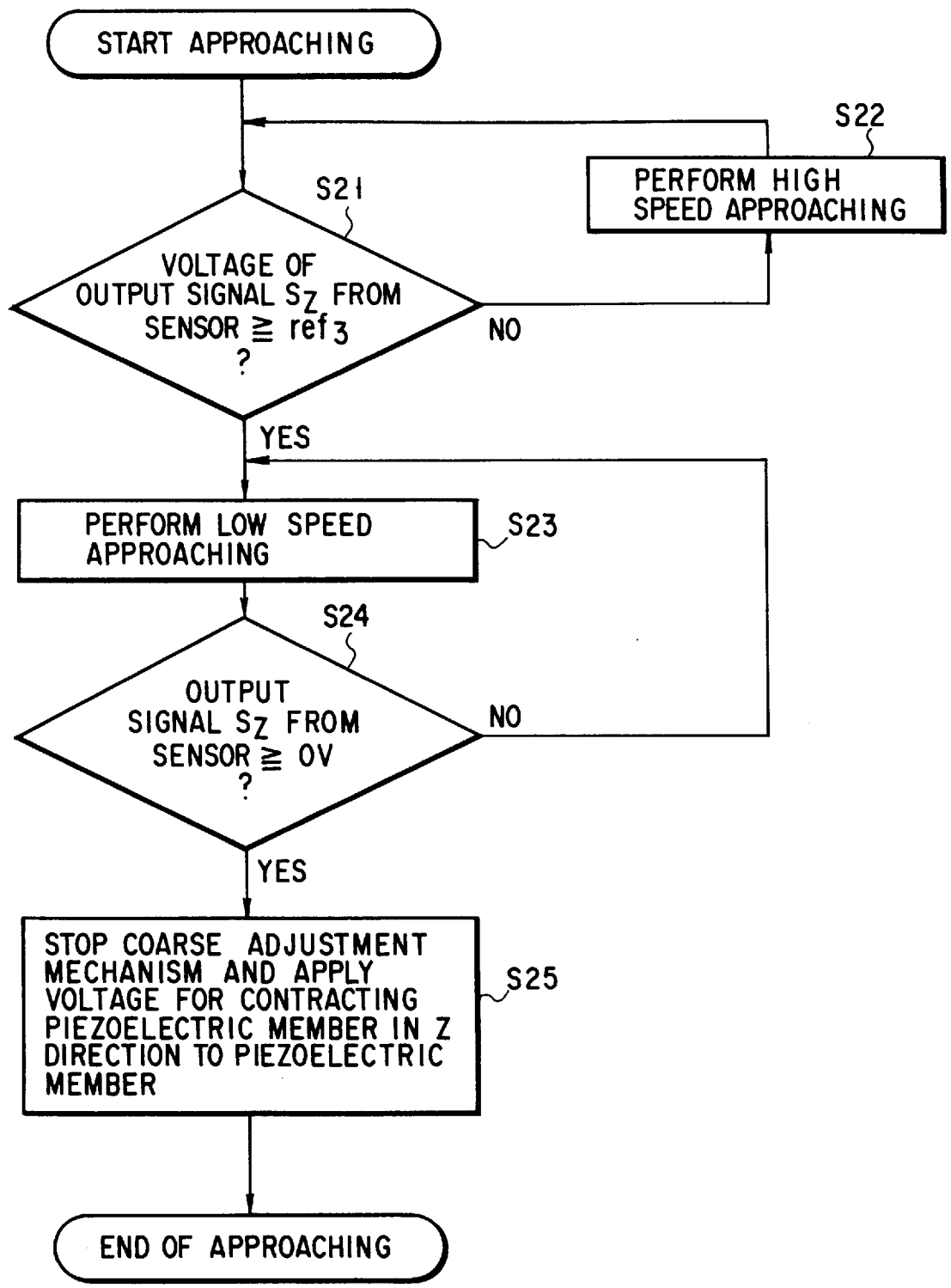
FIG. 18 is a flow chart of the approaching operation of the scanning probe microscope according to the third embodiment.

Referring to a flow chart shown in FIG. 18, the approaching operation of the scanning probe microscope according to the third embodiment will now be described.

The probe displacement signal change detection mechanism 138 uses the output characteristic of the bisectioned light receiving device 88 to calculate the distance from the probe 82 to the sample 72. Moreover, threshold $ref_3$ is provided for the output characteristic curve of the bisectioned light receiving device 88, as shown in FIG. 17. The output voltage Sz from the bisectioned light receiving device 88 is $ref_3$ at point S shown in FIG. 17.

Whether the output voltage from the bisectioned light receiving device 88 is higher than the threshold $ref_3$ is determined (step S21). If the output voltage is lower than the threshold $ref_3$, a high speed operation command is issued from the approaching speed switch section 136 to the motor driver 100 in order to perform the high approaching operation. As a result, the coarse adjustment mechanism 66 is moved downwards from an upper position so that the probe 82 of the cantilever 84 is caused to approach the surface of the sample 72 (step S22). Then, the operation returns to step S21.

If the output signal Sz from the probe displacement signal detection section 92 is higher than the predetermined threshold $ref_3$ in step S21, a low speed operation command is issued from the approaching speed switch section 136 to the motor driver 100. As a result, the approaching speed switch section 136 switches the mode to the low speed approaching operation. At this time, the probe 82 approaches the sample 72 at very low speed (step S23).

In the low speed approaching operation, when the probe 82 is brought into contact with the surface of the sample 72, the cantilever 84 is bent upwards. Therefore, spot P0 of the reflected light beam from the rear side of the cantilever 84 is, as shown in FIG. 16, shifted to the side A (88a) on the bisectioned light receiving device 88. As a result, voltage is output from the probe displacement signal detection section 92 of the cantilever 84.

If the voltage is raised to, for example, Sz=0V (step S24), a turning-off command is issued from the approaching section 94 to the motor driver 100 so that the motor 68 for operating the coarse adjustment mechanism 66 is stopped. Thus, the operation of the coarse adjustment mechanism 66 is interrupted. Simultaneously, voltage of, for example, Va=−100V is applied from the approaching section 94 in order to contract the piezoelectric member 62 in the Z direction. Thus, the piezoelectric member 62 is contracted in the Z direction by about 1 μm, for example, so that the probe 82 is moved apart from the surface of the sample 72 (step S25). As a result of the above-mentioned process, the surface of the sample 72 can automatically be brought into contact with the center of the movable range for the piezoelectric member 62.

As described above, the approaching operation of the scanning probe microscope according to the third embodiment enables a high speed approaching operation to be performed when the probe is positioned apart from the sample. When the probe has approached a position apart for a predetermined distance, the operation is switched to the low speed approaching operation so that the probe approaches the sample at low speed.

As a result, the time required to complete the approaching operation can be shortened. Moreover, force applied to the probe when the sample is brought into contact with the probe during the approaching operation can be reduced. Thus, the tip of the probe and the sample can satisfactorily be protected from being damaged. Thus, the sharpness of the tip of the probe can be maintained so that high resolution measurement is performed.

Moreover, a quick approaching operation can be performed in such a manner that the probe and the sample satisfactorily are protected from being damaged.

In the first to third embodiments, no specific device is used to detect the leaked light reflected from the sample and the light transmitted through the sample. Rather, the light receiving device 88 provided for detecting a replacement of the cantilever 84 is used to detect the leaked light.

Other embodiment which has a device designed to detect the leaked light and the transmitted light to perform approaching operation will be described below.

Referring to FIGS. 19 to 22, a fourth embodiment of the present invention will now be described.

Figure 19:
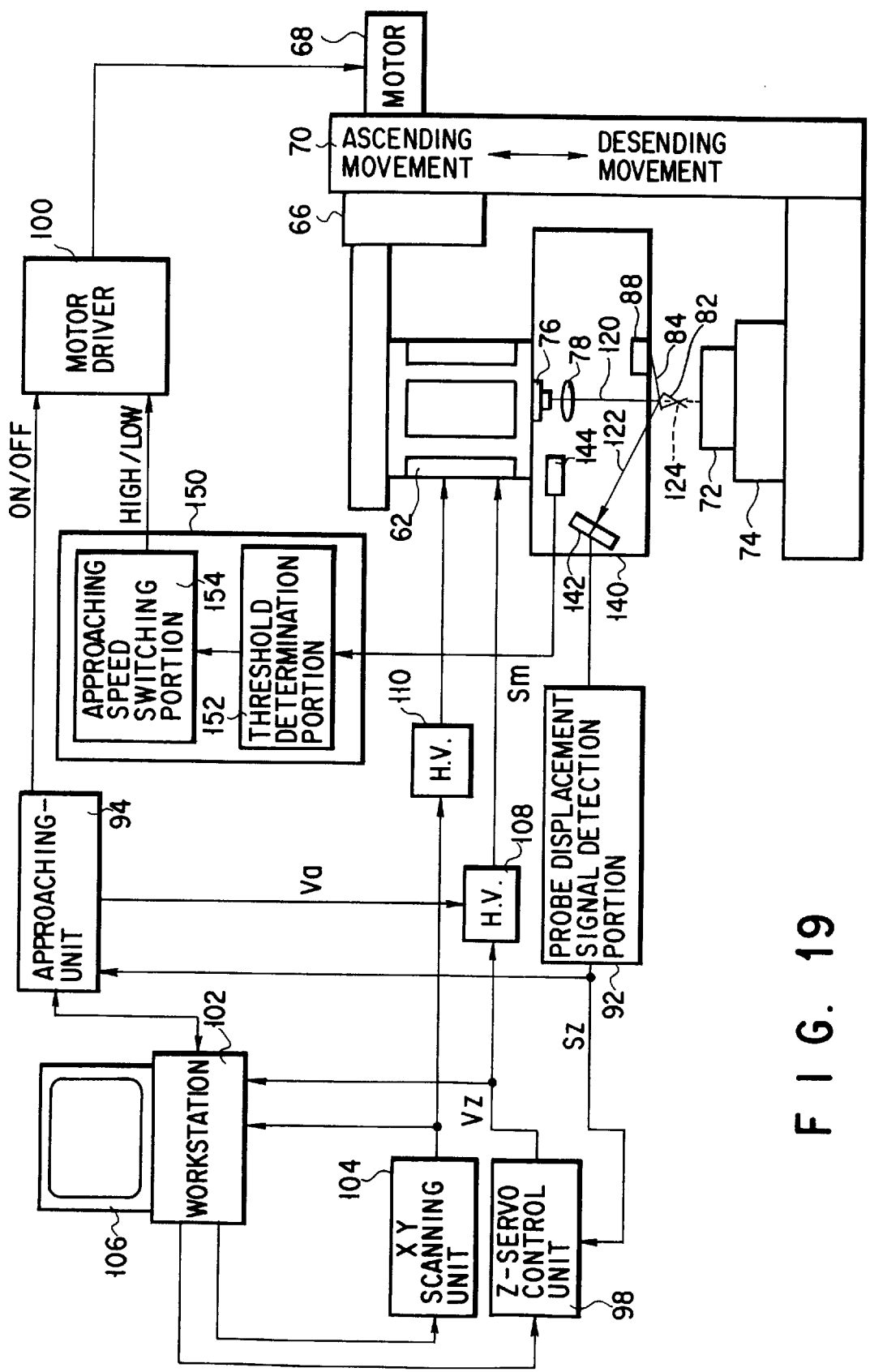
FIG. 19 is a block diagram showing the approaching device of the scanning probe microscope according to a fourth embodiment.

FIG. 19 is a block diagram showing the structure of an approaching device of the scanning probe microscope according to the fourth embodiment. FIG. 20 is a structural view showing a system for detecting displacement of the cantilever of the scanning probe microscope shown in FIG. 19. FIG. 21 is combination of a projection view showing the bisectioned light receiving device, a leaked light signal detection calculating section and surrounding sections according to the fourth embodiment. FIG. 22 is a graph showing the waveform of an output from the leaked light signal detection calculating section shown in FIG. 19.

Referring to FIG. 19, the scanning probe microscope comprises a piezoelectric member 62, an optical displacement sensor 140, a coarse adjustment mechanism 66, a motor 68, a stand 70, a support frame 74 for holding a sample 72, a probe displacement signal detection section 92, an approaching section 94, a motor driver 100, a Z-servo control unit 98, an XY scanning section 104, a work station 102 having an image display unit 106, high voltage (HV) amplifiers 108 and 110 and a leaked light detection calculating section 150.

The optical displacement sensor 140 includes a laser diode 76, a converging lens 78 for converging light beams, a cantilever 84 having a probe 82 at the free end thereof, a support frame 86 for holding the cantilever 84, a light receiving device 142 for receiving reflected light beams 122 of incident light beams 120 reflected from the rear side of the cantilever 84 and a light receiving device 144 for receiving leaked light beams 124.

The leaked light detection calculating section 150 consists of a threshold determination section 152 for comparing output signal Sm from the light receiving device 144 and a predetermined threshold with each other, and a approaching speed switch section 154 for switching the speed of the motor driver 100 in accordance with a determination performed by the threshold determination section 152.

Since other structures are similar to those according to the first to third embodiments, they are omitted from the description.

The probe displacement signal detection section 92 uses the optical displacement sensor 140 employing the optical lever method to measure the displacement of the cantilever 84.

FIG. 20 shows a system for detecting displacement of the cantilever which employs the optical lever method.

As shown in FIG. 20, the sensor detection section has a structure such that the laser diode 76, a collimator lens 78a, a converging lens 78 are attached in such a manner that their optical axes form a straight line. To detect leaked light from the sample 72, the light receiving device 144 consisting of light receiving surfaces 144a and 144b is disposed adjacent to the laser diode 76.

Light beams emitted from the laser diode 76 are converted into parallel light beams by the collimator lens 78a, and then allowed to pass through the converging lens 78 so as to be converged. Incident light beams 120 converged by the converging lens 78 are reflected by the rear side of the cantilever 84 inclined from the horizon by about 10° at the position of the focal point of the converging lens 78. The light beams reflected by the rear side of the cantilever 84 are, as reflected light beams, made incident upon the light receiving device 142.

In the scanning probe microscope having the foregoing structure, the position of the reflected light beams 122 from the rear side of the cantilever 84 on the light receiving device 142 for detecting displacement of the cantilever 84 is adjusted before the approaching operation is performed. In this case, the output voltage from the light receiving device 142 is made to be −0.1V to −0.2V by adjusting, on the light receiving device 142, the position of the spot of the light beam reflected by the rear side of the cantilever 84.

The incident light beam 120 from the laser diode 76 comes in contact with the rear side of the cantilever 84. Moreover, reflected light beams of leaked light are generated. When the sample 72 and the cantilever 84 are positioned apart from each other (in an example case where the sample 72 is positioned apart from the cantilever 84 for distance $h_2$), reflected light beam $144_2$ of leaked light from the surface of the sample 72 has a large diameter so that spot S21 is formed on the light receiving device 144, as shown in FIG. 21.

As the sample 72 approaches the probe 82, the diameter of the spot of the reflected light beam of leaked light is reduced. For example, reflected light beam $144_1$ of leaked light is formed into spot S22 when the sample is positioned apart from the probe 82 for distance $h_1$. That is, while the diameter of the spot being reduced (S21 to S22), the spot is shifted to the right-hand position (144a) of the light receiving device 144, as shown in FIG. 21. After the sample 72 has approached the cantilever 84 for a distance shorter than $h_1$, the spot is separated from the light receiving device 144.

An output signal of an operation signal (A−B) from the light receiving device 144 corresponding to the distance from the sample 72 to the probe 82 is, during the approaching operation, as shown in a characteristic curve, as shown in FIG. 22.

The leaked light detection calculating section 150, at the time of performing the approaching operation, uses change in the output characteristic from the light receiving device 144 to calculate the distance from the probe 82 to the sample 72.

As shown in FIG. 22, threshold $ref_4$ is set at point a on the output characteristic curve of the light receiving device 144. When the threshold determination section 152 in the leaked light detection calculating section 150 has determined that the output voltage Sm from the light receiving device 144 is smaller than the threshold $ref_4$, the high-speed approaching operation is performed. In the present embodiment, the output signal Sm of the light receiving device 144 reaches the value $ref_4$ not only at point a where the high- and low-speed approaching operations are switched, but also as point g, as seen from FIG. 22. It is therefore necessary for the threshold determination section 152 to switch the speed of the approaching operation at point a at which the output signal Sm falls below the value $ref_4$ after it has exceeded the value $ref_4$. In accordance with the output from the threshold determination section 152, a high speed operation command is issued from the approaching speed switch section 154 to the motor driver 100. As a result, the coarse adjustment mechanism 66 is quickly moved downwards from an upper position so that the probe 82 of the cantilever 84 is caused to approach the surface of the sample 72.

If the threshold determination section 152 determineds that the output signal Sm from the light receiving device 144 has reached point a where the signal Sm falls below the value $ref_4$ after it has exceeded the value $ref_4$, a low speed operation command is issued from the approaching speed switch section 154 to the motor driver 100. As a result, the motor 68 is rotated at low speed by the approaching speed switch section 154 so that the operation is shifted to the low speed approaching operation. At this time, the probe 82 is caused to approach the sample 72 at very low speed.

Since the cantilever 84 is bent upwards when the probe 82 has been brought into contact with the surface of the sample 72, the spot of the reflected light beams 122 from the rear side of the cantilever 84 is shifted on the light receiving device 142. As a result, the level of the voltage of output signal Sz from the probe displacement signal detection section 92 of the cantilever 84 is raised.

When the output signal Sz reaches, for example, 0V, a turning-off command is issued from the approaching section 94 to the motor driver 100. As a result, the rotation of the motor 68 for operating the coarse adjustment mechanism 66 is stopped so that the operation of the coarse adjustment mechanism 66 is interrupted. Simultaneously, voltage of, for example, −100V is applied from the approaching section 94 in order to contract the piezoelectric member 62 in the Z direction. As a result, the piezoelectric member 62 is contracted in the Z direction so that the probe 82 is moved apart from the surface of the sample 72 for about 1 μm, for example.

As a result of the above-mentioned process, the surface of the sample 72 can automatically be brought into contact with the center of the movable range for the piezoelectric member 62.

As a matter of course, the fourth embodiment may employ a method in which a differentiator is added to the leaked light detection calculating section 150 to switch the approaching speed in accordance with the slope of the signal (A–B).

Since the scanning probe microscope is structured as described above, leaked light can be detected more widely when the approaching operation is performed. Therefore, when the probe and the sample are positioned apart from each other, the probe is caused to approach the sample at the high approaching speed. After the probe has been moved to a position apart from the sample for a predetermined distance, the probe is caused to approach the sample at the low approaching speed. As a result, force applied from the sample to the probe can be reduced during the approaching operation. Moreover, force applied to the probe from the sample during the approaching operation can be reduced. Thus, the leading end of the probe and the sample can satisfactorily be protected from being damaged. Moreover, the time required to complete the approaching operation can be shortened. Since the sharpness of the tip of the probe can be maintained, high resolution measurement can be performed.

Moreover, a quick approaching operation can be performed in such a manner that the probe and the sample satisfactorily are protected from being damaged.

Referring to FIGS. 23 to 26, a fifth embodiment of the present invention will now be described.

FIG. 23 is a block diagram showing the structure of an approaching device of the scanning probe microscope according to the fifth embodiment. FIG. 24 is a structural view showing a system for detecting displacement of the cantilever of the scanning probe microscope shown in FIG. 23. FIG. 25 is combination of a projection view showing the bisectioned light receiving device, a leaked light signal detection calculating section and surrounding sections according to the fifth embodiment. FIG. 26 is a graph showing the waveform of an output from the leaked light signal detection calculating section with respect to the distance from the sample to the probe during the approaching operation.

Referring to FIG. 23, a displacement sensor 160 includes a laser diode 76, a converging lens 78, a reflecting mirror 80, a cantilever 84 and light receiving devices 142 and 144. The cantilever 84 extends at right angles to the incident light beam 120. Hence, the beam 120 is applied sideways to the cantilever 84.

Since the other structures are the same as those according to the first to fourth embodiments, they are omitted from the description.

As shown in FIG. 24, the displacement sensor 160 has the structure such that the laser diode 76, the collimator lens 78a and the converging lens 78 are attached in such a manner that their optical axes form a straight line. To detected reflected light of leaked light from the sample 72, the light receiving device 144 is disposed adjacent to the light receiving device 142.

Light beams from the laser diode 76 is converted into parallel light beams by the collimator lens 78a, and then allowed to pass through the converging lens 78 so as to be formed into the incident light beam 120. Then, the converged light beam (incident light) 120 is applied sideways to the cantilever 84. Thus, the beam 120 illuminates the rear side of the cantilever 84 disposed at the position of the focal point of the converging lens 78. Light beams (reflected light) 122 reflected by the rear side of the cantilever 84 are made incident upon the light receiving device 142. A section of the incident light beam 120 comes in contact with the surface of the sample 72 below the cantilever 84 so that leaked light beams 124 of leaked light from the sample 72 are made incident upon the light receiving device 144.

The operation of the scanning probe microscope having the foregoing structure will now be described.

Prior to performing the approaching operation, the position of the reflected light beam from the rear side of the cantilever 84 is adjusted on the light receiving device 142 for detecting displacement of the cantilever 84. To make the output voltage from the light receiving device 142 to be −0.1V to −0.2V, the position of the light receiving device 142 or the angle of the cantilever 84 is adjusted.

When the incident light beam 120 is made incident upon the rear side of the cantilever 84 as shown in FIG. 24, reflected light beams 122 are generated and also leaked light beams 124 are generated. When the distance from the sample 72 to the cantilever 84 is long (for example, when the sample is positioned apart from the cantilever 84 for distance $h_2$), the diameter of the leaked laser beam from the surface of the sample 72 is large such that spot S31 as shown in FIG. 25 is formed on the light receiving device 144.

As the distance from the sample 72 to the probe 82 is shortened, the diameter of the reflected light beams 124 of leaked light is reduced so that spot S32 is formed on the light receiving device 144 when the sample is positioned apart from the cantilever 84 for distance $h_1$.

The leaked light detection calculating section 150 uses the output characteristic from the light receiving device 144 to determine the distance from the probe 82 to the sample 72. As shown in FIG. 26, threshold $ref_5$ is set at point B on the output characteristic curve from the light receiving device 144.

When a determination has been performed by the threshold determination section 152 of the leaked light detection calculating section 150 that the output voltage Sm from the light receiving device 144 is smaller than the threshold $ref_5$, the high speed approaching operation is performed. That is, a high speed operation command is issued from the approaching speed switch section 154 to the motor driver 100. As a result, the coarse adjustment mechanism 66 is quickly moved downwards from an upper position so that the probe 82 of the cantilever 84 is caused to approach the surface of the sample 72.

When a determination has been performed by the threshold determination section 152 that the output voltage Sm from the light receiving device 144 has exceeded the predetermined threshold $ref_5$, a low speed operation command is issued from the approaching speed switch section 154 to the motor driver 100. That is, the operation is switched to the low speed approaching operation by the approaching speed switch section 154. As a result, the probe 82 is caused to approach the sample 72 at very low speed.

When the probe 82 has been brought into contact with the surface of the sample 72, the cantilever 84 is upwards bent so that the spot of the reflected light beams 122 from the rear side of the cantilever 84 is shifted on the light receiving device 142. Therefore, the level of the output signal Sz from the probe displacement signal detection section 92 of the cantilever 84 is raised. When the level of the output signal Sz has reached, for example, 0V, a turning off command is issued from the approaching section 94 to the motor driver 100 so that the rotation of the motor 68 for operating the coarse adjustment mechanism 66 is interrupted. As a result, the operation of the coarse adjustment mechanism 66 is interrupted. Simultaneously, voltage of, for example, −100V is applied from the approaching section 94 in order to contract the piezoelectric member 62 in the Z direction. Thus, the piezoelectric member 62 is contracted in the Z direction so that the probe 82 is moved apart from the surface of the sample 72 for about 1 μm, for example.

As a result of the above-mentioned process, the surface of the sample 72 can automatically be brought into contact with the center of the movable range for the piezoelectric member 62.

As a matter of course, the fifth embodiment may employ a method in which a differentiator is added to the leaked light detection calculating section 150 to switch the approaching speed in accordance with the slope of the signal (A–B).

The scanning probe microscope according to the fifth embodiment of the present invention performs the approaching operation as described above such that when the probe and the sample are positioned apart from each other, the high speed approaching operation is performed to cause the probe to approach the sample in a short time. After the probe has been moved to a position apart from the sample for a predetermined distance, the probe is caused to approach the sample at the low approaching speed. As a result, force applied from the sample to the probe can be reduced at the time of contact. Moreover, the tip of the probe and the sample can satisfactorily be protected from being damaged. Moreover, the time required to complete the approaching operation can be shortened. Since the sharpness of the tip of the probe can be maintained, high resolution measurement can be performed.

Moreover, a quick approaching operation can be performed in such a manner that the probe and the sample satisfactorily are protected from being damaged.

Although the fifth embodiment has the structure such that the two types of light receiving devices 142 and 144 are employed, another structure may be employed in which one light receiving device is employed to cause the light beams to be made incident from the laser diode 76 from a side position of the cantilever 84. In other words, the light beam emitted from the laser diode 76 can be applied sideways to the cantilever, also in the first to third embodiments.

Figure 27:
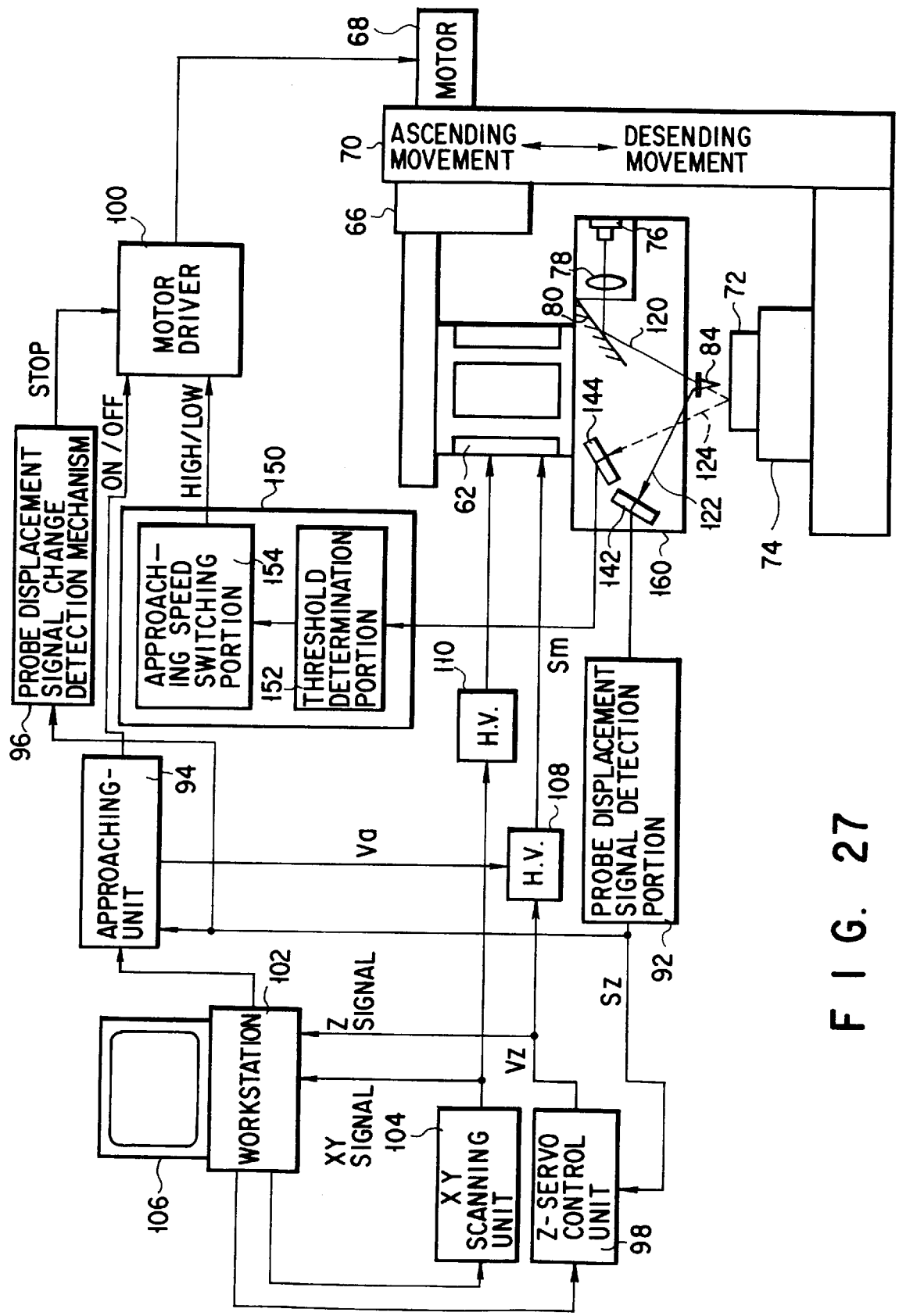
FIG. 27 is a block diagram showing the structure of the approaching device of the scanning probe microscope according to a sixth embodiment.

FIG. 27 is a block diagram showing the structure of an approaching device of the scanning probe microscope according to a sixth embodiment. FIG. 28 is combination of a projection view showing the bisectioned light receiving device, a leaked light signal detection calculating section and surrounding sections according to the sixth embodiment. FIG. 29A is a graph showing the waveform of an output from the bisectioned light receiving device according to the sixth embodiment. FIG. 29B is a graph showing the waveform of an output from the differentiation operation section according to the sixth embodiment.

Referring to FIG. 27, an output from the probe displacement signal detection section 92 is supplied to the Z-servo control unit 98, the approaching section 94 and the probe displacement signal change detection mechanism 96. An output from the probe displacement signal change detection mechanism 96 is, as an interruption command, supplied to the motor driver 100.

The other structures and operations are similar to the according to the fifth embodiment, they are omitted from the description.

In the probe displacement signal change detection mechanism 96 according to this embodiment, the signal Sz from the probe displacement signal detection section 92 received by the light receiving device 142 is supplied to the differentiation operation section 114, as shown in FIGS. 28 and 29A. Thus, the signal Sz is differentiated, and then supplied to the threshold determination section 116. The threshold determination section 116 compares the output signal d (Sz)/dt from the differentiation operation section 114 with the predetermined threshold $ref_1$ as shown in FIG. 29B. When the output signal d (Sz)/dt has exceeded the threshold $ref_1$, an interruption command is issued from the approach interruption section 118 to the motor driver 100 so that the approaching operation is interrupted.

Also the foregoing structure attains an effect similar to that obtainable from the first to third embodiments to be obtained.

Additional advantages and modifications will readily occur to those skilled in the art. Therefore, the invention in its broader aspects is limited to the specific details, and representative devices shown and described herein. Accordingly, various modifications ma be made without departing from the spirit or scope of the general inventive concept as defined by the appended claims and their equivalents.

What is claimed is:

1. An approaching device of a scanning probe microscope comprising:
   a probe disposed opposite to a sample;
   a cantilever having a proximal end portion and a free end portion which holds said probe;
   scanning means for relatively moving said probe and said sample;
   displacement detection means for optically detecting displacement of said cantilever caused by a force acting between said probe and said sample, said displacement detection means including a light source for irradiating said cantilever with a laser beam and light detection means for detecting a light beam reflected by said cantilever;
   approaching means for relatively changing a distance between said probe and said sample so as to cause said probe and said sample to approach each other;
   sample reflection light detection means for detecting sample reflection light which is produced by the laser beam when the laser beam reaches said sample and is reflected by a surface of said sample; and
   movement-speed switch means for switching a movement speed of said approaching means in accordance with an output signal output by said sample reflection light detection means.

2. An approaching device according claim 1, wherein:
   said movement-speed switch means includes a threshold determination section for determining whether the output signal output by said sample reflection light detection means has exceeded a predetermined threshold, and
   said movement-speed switch means switches the movement speed of said approaching means in accordance with a threshold determination signal output by said threshold determination section.

3. An approaching device according claim 1, further comprising means for interrupting a movement of the approaching means in accordance with the output signal output by said sample reflection light detection means, and for causing said scanning means to move said probe and said sample apart from each other.

4. An approaching device according claim 1, wherein said cantilever comprises a first surface and a second surface, said probe being provided on said first surface, and said light source of the displacement detection means irradiating the laser beam at a given angle to said second surface.

5. An approaching device according claim 1, wherein said cantilever comprises a first surface and a second surface, said probe being provided on said first surface, and said light source of the displacement detection means irradiating the laser beam at substantially a right angle to said second surface.

6. An approaching device according claim 1, wherein said light source of the displacement detection means irradiates the laser beam in a direction substantially perpendicular to said sample.

7. An approaching device according to claim 1, wherein said light source of the displacement detection means irradiates the laser beam sideways at a given angle to said cantilever.

8. An approaching device of a scanning probe microscope comprising:
   a probe disposed opposite a sample;
   a cantilever having a free end portion which holds the probe;
   a scanning mechanism for relatively moving the probe and the sample;
   a rough adjustment mechanism which is movable to relatively change a distance between the probe and the sample so as to cause the probe and the sample to approach each other;
   a light source arranged to emit a laser beam which reaches the cantilever and which is reflected by the cantilever to produce cantilever reflection light;
   a light receiving device, provided on an opposite side of the sample with respect to the cantilever, for detecting, based on the cantilever reflection light, displacement of the cantilever caused by a force acting between the probe and the sample, and for detecting sample reflection light which is produced by the laser beam when the laser beam reaches the sample and is reflected by a surface of the sample; and
   a movement interruption section for detecting, based on a change in a light output signal output by the light receiving device, a contact point of the probe and the sample as the probe and the sample are moved closer to each other by the rough adjustment mechanism, and for interrupting a movement of the rough adjustment mechanism approximately at the contact point.

9. An approaching device of a scanning probe microscope according to claim 8, wherein the movement interruption section includes:
   a differentiation operation section for differentiating the light output signal output by the light receiving device;
   a threshold determination section for determining whether a value denoted by a differentiation operation signal output by the differentiation operation section has exceeded a predetermined threshold; and
   an approaching interruption section for performing control to interrupt the movement of the rough adjustment mechanism in accordance with a threshold determination output signal output by the threshold determination section.

10. An approaching device of a scanning probe microscope according to claim 8, further comprising a movement-speed switch section for reducing, based on the light output signal output by the light receiving device, a movement speed of the rough adjustment mechanism before the probe and the sample are brought into contact with each other.

11. An approaching device of a scanning probe microscope according to claim 8, further comprising a controller for controlling the scanning mechanism to move the probe and the sample apart from each other after the movement of the rough adjustment mechanism has been interrupted.

12. An approaching device of a scanning probe microscope according to claim 9, further comprising a movement-speed switch section for reducing a movement speed of the rough adjustment mechanism in accordance with a determination performed by the threshold determination section with respect to whether the differentiation operation signal output by the differentiation operation section has exceeded a second threshold which is different from the predetermined threshold.

13. An approaching device of a scanning probe microscope according to claim 10, wherein the scanning mechanism comprises a piezoelectric member having a fixed end and a free end, said fixed end being connected to the rough adjustment mechanism and said free end having provided thereon the light source and the light receiving device.

14. An approaching device of a scanning probe microscope according to claim 13, further comprising a controller for controlling the piezoelectric member to contract in a direction in which the probe and the sample are moved apart from each other after the movement of the rough adjustment mechanism has been interrupted.

15. An approaching device according to claim 8, wherein the light source emits the laser beam sideways at a given angle to the cantilever.

16. An approaching device of a scanning probe microscope comprising:

a probe disposed opposite a sample;

a cantilever having a free end portion which holds the probe;

a scanning mechanism for relatively moving the probe and the sample;

a rough adjustment mechanism which is movable to relatively change a distance between the probe and the sample so as to cause the probe and the sample to approach each other;

a light source arranged to emit a laser beam which reaches the cantilever and which is reflected by the cantilever to produce cantilever reflection light;

a light receiving device, provided on an opposite side of the sample with respect to the cantilever, for detecting, based on the cantilever reflection light, displacement of the cantilever caused by a force acting between the probe and the sample, and for detecting sample reflection light which is produced by the laser beam when the laser beam reaches the sample and is reflected upon a surface of the sample; and a movement-speed switch section for reducing, based on an output signal output by the light receiving device, a movement speed of the rough adjustment mechanism before the probe and the sample are brought into contact with each other; and a movement interruption section for interrupting a movement of the probe and the sample as the probe and the sample are being moved closer to each other at the reduced movement speed based on the output signal output by the light receiving device, said movement interruption section detecting a positional relationship of the probe and the sample based on the output signal output by the light receiving device and interrupting a movement of the rough adjustment mechanism at a targeted contact point.

17. An approaching device of a scanning probe microscope according to claim 16, wherein the movement-speed switch section includes a threshold determination section for determining whether the displacement of the cantilever has exceeded a predetermined threshold, and switches the movement speed of the rough adjustment mechanism in accordance with a threshold determination output signal output by the threshold determination section.

18. An approaching device of a scanning probe microscope comprising:

a probe disposed opposite a sample;

a cantilever having a free end portion which holds the probe;

a scanning mechanism for relatively moving the probe and the sample;

a rough adjustment mechanism which is movable to relatively change a distance between the probe and the sample so as to cause the probe and the sample to approach each other;

a displacement detecting section for detecting displacement of the cantilever caused due to a force acting between the probe and the sample;

a distance detecting sensor for detecting a change in the distance between the probe and the sample caused in accordance with a movement of the rough adjustment mechanism; and a movement-speed switch section for reducing, based on an output signal output by the distance detecting sensor, an approach speed of the probe and the sample which is determined by the movement of the rough adjustment mechanism before the probe and the sample are brought into contact.

19. An approaching device of a scanning probe microscope according to claim 18, further comprising a movement interruption section for interrupting a movement of the probe and the sample as the probe and the sample are being move closer to each other at the reduced approach speed based on a displacement signal output by the displacement detecting section.

20. An approaching device of a scanning probe microscope according to claim 19, wherein the movement interruption section detects a positional relationship of the probe and the sample based on the displacement signal output by the displacement detecting section and interrupts the movement of the rough adjustment mechanism at a targeted contact point.

21. An approaching device of a scanning probe microscope according to claim 20, wherein the movement interruption section detects a contact point of the probe and the sample based on a change in the displacement signal output by the displacement detecting section, and interrupts the movement of the rough adjustment mechanism approximately at the targeted contact point.

22. An approaching device of a scanning probe microscope according to claim 18, wherein the scanning mechanism comprises a piezoelectric member having a fixed end portion and a free end portion, said free end portion holding the displacement detecting section and the distance detecting sensor.

23. An approaching device of a scanning probe microscope according to claim 22, wherein the displacement detecting section includes:

a light source arranged to emit a laser beam which reaches the cantilever and which is reflected by the cantilever to produce cantilever reflection light;

a light receiving device, provided on an opposite side of the sample with respect to the cantilever, for detecting, based on the cantilever reflection light, displacement of the cantilever caused by a force acting between the probe and the sample.

24. An approaching device of a scanning probe microscope according to claim 23, wherein the distance detecting sensor comprises another light receiving device for detecting sample reflection light which is produced by the laser beam when the laser beam reaches the sample and is reflected by a surface of the sample.

25. An approaching device of a scanning probe microscope according to claim 18, wherein the movement-speed switch section includes a threshold determination section for comparing the output signal output by the distance detecting sensor to a predetermined threshold value, and changes a movement speed of the rough adjustment mechanism based on a threshold determination output signal output by the threshold determination section.

* * * * *